US012752269B2

(12) United States Patent
Yadavali et al.

(10) Patent No.: US 12,752,269 B2
(45) Date of Patent: *Oct. 6, 2026

(54) LARGE SCALE MICRODROPLET GENERATION APPARATUS AND METHODS OF MANUFACTURING THEREOF

(71) Applicant: The Trustees of the University of Pennsylvania, Philadelphia, PA (US)

(72) Inventors: Sagar Yadavali, Philadelphia, PA (US); David Issadore, Philadelphia, PA (US); Daeyeon Lee, Wynnewood, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 280 days.

This patent is subject to a terminal disclaimer.

(21) Appl. No.: 17/380,486

(22) Filed: Jul. 20, 2021

(65) Prior Publication Data

US 2022/0184613 A1 Jun. 16, 2022

Related U.S. Application Data

(63) Continuation of application No. 16/062,724, filed as application No. PCT/US2016/066501 on Dec. 14, 2016, now Pat. No. 11,097,267.

(Continued)

(51) Int. Cl.

*B01L 3/00* (2006.01)
*B01F 23/41* (2022.01)

(Continued)

(52) U.S. Cl.

CPC ........ *B01L 3/502707* (2013.01); *B01F 23/41* (2022.01); *B01F 25/314* (2022.01);

(Continued)

(58) Field of Classification Search

CPC ......... B01L 3/502707; B01L 3/502746; B01L 3/502792; B01L 2200/027;

(Continued)

(56) References Cited

U.S. PATENT DOCUMENTS

| | | | | |
|---|---|---|---|---|
| 6,494,614 | B1 | 12/2002 | Bennett et al. | |
| 9,110,026 | B2 | 8/2015 | Collins | |
| 11,097,267 | B2 * | 8/2021 | Yadavali | B01F 33/3011 |
| 2008/0181829 | A1 | 7/2008 | Matteo | |
| 2009/0139576 | A1 | 6/2009 | Crenshaw et al. | |
| 2010/0055673 | A1 | 3/2010 | Agarwal et al. | |
| 2010/0268469 | A1 | 10/2010 | Harrison et al. | |

(Continued)

FOREIGN PATENT DOCUMENTS

WO 2015/050960 A1 4/2015

OTHER PUBLICATIONS

Romanowsky, Mark, Abate, Adam et al, Lab Chip, 2012, 12, 802-807. (Year: 2012).*

(Continued)

*Primary Examiner* — Christine T Mui
(74) *Attorney, Agent, or Firm* — BakerHostetler

(57) ABSTRACT

A microfluidic device includes at least one substrate formed of one or more silicon wafers. The substrate includes an inlet for receiving a continuous phase fluid; an inlet for receiving a dispersed phase fluid; and a plurality of channels. The plurality of channels are in fluid communication with both the inlet of the continuous phase fluid and the inlet of the dispersed phase fluid. The substrate further includes a plurality of droplet generators configured to produce microdroplets. Each of the droplet generators are in fluid communication with the plurality of channels. Additionally, the substrate includes one or more outlets for delivery of the microdroplets. The number of the plurality of droplet generators is more than two greater than a number of the one or more outlets for delivery of the microdroplets.

11 Claims, 17 Drawing Sheets

Related U.S. Application Data

(60) Provisional application No. 62/268,205, filed on Dec. 16, 2015.

(51) Int. Cl.
*B01F 25/314* (2022.01)
*B01F 33/3011* (2022.01)
*B01F 33/81* (2022.01)
*B05B 1/08* (2006.01)
*B01F 23/40* (2022.01)

(52) U.S. Cl.
CPC ........ *B01F 33/3011* (2022.01); *B01F 33/813* (2022.01); *B01L 3/502746* (2013.01); *B01L 3/502792* (2013.01); *B05B 1/08* (2013.01); *B01L 2200/027* (2013.01); *B01L 2300/0816* (2013.01); *B01L 2300/0861* (2013.01)

(58) Field of Classification Search
CPC ...... B01L 2300/0816; B01L 2300/0861; B01F 33/3011
USPC .................................................. 422/502, 500
See application file for complete search history.

(56) References Cited

U.S. PATENT DOCUMENTS

| | | | |
|---|---|---|---|
| 2011/0143383 | A1 | 6/2011 | Jonsmann et al. |
| 2011/0151578 | A1 | 6/2011 | Abate et al. |
| 2012/0121481 | A1 | 5/2012 | Romanowsky et al. |
| 2014/0170665 | A1 | 6/2014 | Hiddessen et al. |
| 2014/0338753 | A1 | 11/2014 | Sperling et al. |
| 2016/0271609 | A1 | 9/2016 | Issadore et al. |

OTHER PUBLICATIONS

Anderson et al., "Fabrication of Microfluidic Systems in Poly (dimethylsiloxane)", Electrophoresis, 2000, vol. 21, No. 1, pp. 27-40.

Baroud et al., "Dynamics of Microfluidic Droplets", Lab on a Chip, 2010, vol. 10, No. 16, pp. 2032-2045.

Jeong et al., "Kilo-Scale Droplet Generation in Three-Dimensional Monolithic Elastomer Device (3D MED)", Lab on a Chip, 2015—4 pages.

Kreutz et al., "Evolution of Catalysts Directed by Genetic Algorithms in a Plug-Based Microfluidic Device Tested with Oxidation of Methane by Oxygen", Journal of the American Chemical Society, 2010, vol. 132, No. 9, pp. 3128-3132.

Kuncova-Kallio et al., "PDMS and its Suitability for Analytical Microfluidic Devices", in Engineering in Medicine and Biology Society, 2006. EMBS'06. 28th Annual International Conference of the IEEE. 2006. IEEE—5 pages.

Lee et al., "Solvent Compatibility of Poly (dimethylsiloxane)-based Microfluidic Devices", Analytical Chemistry, 2003, vol. 75, No. 23, pp. 6544-6554.

Muluneh et al., "Hybrid Soft-Lithography/Laser Machined Microchips for the Parallel Generation of Droplets", Lab Chip, 2013, vol. 13, No. 24, pp. 4750-4754.

Nunes et al., "Dripping and Jetting in Microfluidic Multiphase Flows Applied to Particle and Fibre Synthesis", Journal of Physics D: Applied Physics, 2013, vol. 46, No. 11, p. 114002.

Teh et al., "Droplet Microfluidics", Lab on a Chip, 2008, vol. 8, No. 2, pp. 198-220.

Tewhey et al., "Microdroplet-based PCR Enrichment for Large-scale Targeted Sequencing", Nature Biotechnology, 2009, vol. 27, No. 11, pp. 1025-1031.

Toepke et al., "PDMS Absorption of Small Molecules and Consequences in Microfluidic Applications", Lab Chip, 2006, vol. 6, No. 12, pp. 1484-1486.

Van Steijn et al., "Predictive Model for the Size of Bubbles and Droplets Created in Microfluidic T-Junctions", Lab Chip, 2010, vol. 10, No. 19, pp. 2513-2518.

Whitesides et al., "Flexible Methods for Microfluidics", J. Phys Today, 2001, vol. 54, No. 6, pp. 42-48.

Xia et al., "Soft lithography", Annual Review of Materials Science, 1998, vol. 28,, No. 1, pp. 153-184.

Zhu et al., "Analytical Detection Techniques for Droplet Microfluidics A review", Analytics Chimica Acta, 2013, vol. 787, pp. 24-35.

* cited by examiner

LARGE SCALE MICRODROPLET GENERATION APPARATUS AND METHODS OF MANUFACTURING THEREOF

CROSS-REFERENCE TO RELATED APPLICATIONS

This application is a continuation of now-allowed U.S. application Ser. No. 16/062,724, "Large Scale Microdroplet Generation Apparatus And Methods Of Manufacturing Thereof" (filed Jun. 15, 2018), which is a U.S. National Phase filing of International Application PCT/US2016/066501, "Large Scale Microdroplet Generation Apparatus And Methods Of Manufacturing Thereof" (filed Dec. 14, 2016), which international application claims priority to U.S. Provisional Application No. 62/268,205, "Large Scale Microdroplet Generation Apparatus And Methods Of Manufacturing Thereof" (filed Dec. 16, 2015), the contents of which foregoing application are incorporated fully herein by reference for any and all purposes.

FIELD OF THE INVENTION

This invention relates to microfluidic devices and methods of manufacturing the same.

BACKGROUND OF THE INVENTION

Microfluidics have been used to generate a wide variety of micro-scale emulsions and microbubbles, with control over size, shape, and composition not possible with conventional methods. These microfluidic devices utilize a flow geometry known as a droplet maker or drop maker.

The small scale of microfluidics allows precise control of the balance between surface tension and viscous forces in multiphasic flows, making it possible to generate highly monodisperse droplets. Micrometer-scale droplets and/or emulsions have been utilized for a wide variety of applications including digital biological assays, the generation of functional microparticles, and the on-chip synthesis of nanoparticles. However, by virtue of its small feature sizes, droplet microfluidic devices have been limited to low volumetric production, making traditional microfluidic droplet makers unsuitable for high production commercial applications.

SUMMARY OF THE INVENTION

Aspects of the invention relate to apparatuses for large scale microdroplet generation and methods of manufacturing such apparatuses.

In accordance with one aspect, the invention provides a microfluidic device having a microdroplet generator that includes at least one substrate formed of one or more silicon wafers. The substrate includes an inlet for receiving a continuous phase fluid; an inlet for receiving a dispersed phase fluid; and a plurality of channels. The plurality of channels are in fluid communication with both the inlet of the continuous phase fluid and the inlet of the dispersed phase fluid. The substrate further includes a plurality of droplet generators configured to produce microdroplets. Each of the droplet generators are in fluid communication with the plurality of channels. Additionally, the substrate includes one or more outlets for delivery of the microdroplets, wherein a number of the plurality of droplet generators is more than two greater than a number of the one or more outlets for delivery of the microdroplets.

According to another aspect, the invention provides a microfluidic device having a microdroplet generator that includes at least one silicon substrate. The silicon substrate includes one or more wafers. The silicon substrate is defined by a substantially planar top surface and a substantially planar bottom surface. The silicon substrate further includes an inlet for receiving a continuous phase fluid; an inlet for receiving a dispersed phase fluid; a plurality of channels, the plurality of channels in fluid communication with both the inlet of the continuous phase fluid and the inlet of the dispersed phase fluid; a plurality of droplet generators configured to produce microdroplets, each of the droplet generators in fluid communication with the plurality of channels; and one or more outlets for delivery of the microdroplets. A number of the plurality of droplet generators is more than two greater than a number of the one or more outlets for delivery of the microdroplets. The microfluidic device further includes a first outer support comprised of glass, the first outer support connected to the top surface, the first outer support includes a first aperture that is in fluid communication with the inlet for receiving the continuous phase fluid, a second aperture that is in fluid communication with the inlet for receiving dispersed phase fluid. The first outer support may also include a third and a fourth aperture in fluid communication with an outlet for collecting generated emulsions. Additionally, the microfluidic device includes a second outer support comprised of glass.

In accordance with yet another aspect, the invention provides a method for manufacturing a microfluidic device from at least one silicon wafer. The method includes the steps of forming a first mask layer on a first side of the at least one silicon wafer and forming a second mask layer on a second side of the at least one silicon wafer; and etching the first side and the second side of the at least one silicon wafer to create: an inlet for receiving a continuous phase fluid, an inlet for receiving a dispersed phase fluid, an outlet for the generated emulsion, a plurality of channels, the plurality of channels in fluid communication with both the inlet of the continuous phase fluid and the inlet of the dispersed phase fluid, a plurality of droplet generators configured to produce microdroplets, and one or more outlets for delivery of the microdroplets. Each of the droplet generators are in fluid communication with the plurality of channels. The method further including the step of connecting the at least one silicon wafer to both a first outer support and a second outer support.

According to another aspect, the invention provides a method for manufacturing a microfluidic device from at least two wafers. The method includes the steps of forming a mask layer on a surface of a first silicon wafers; forming a mask layer on a surface of a second silicon wafer; etching the surface of the first silicon wafer and the surface of the second silicon wafer; and connecting the first silicon wafer to the second silicon wafer.

In accordance with a further aspect, the invention provides a microfluidic device including at least one substrate, the substrate including one or more silicon wafers. The substrate defined by a substantially planar top surface and a substantially planar bottom surface. The substrate further including a continuous phase inlet for receiving a continuous phase fluid, a dispersed phase inlet for receiving a dispersed phase fluid, a outlet for emulsion, a plurality of droplet generators configured to produce microdroplets, each of the droplet generators in fluid communication with an outlet for delivery of the microdroplets. The plurality of channels coupled to the plurality of droplet generators, the continuous phase inlet, and the dispersed phase inlet such that the plurality of droplet generators is in fluid communication with the continuous phase inlet and the dispersed phase inlet. The plurality of channels having one or more dispersed phase supply channels coupled to the dispersed phase inlet and a plurality of dispersed phase delivery channels. The plurality of dispersed phase delivery channels coupled to the droplet generators, such that the dispersed phase inlet is in fluid communication with the plurality of droplet generators. The plurality of channels also having one or more continuous phase supply channels coupled to the continuous phase inlet and a plurality of continuous phase delivery channels. The plurality of continuous phase delivery channels coupled to the droplet generators, such that the continuous phase inlet is in fluid communication with the plurality of droplet generators. Additionally, the microfluidic device having a first outer support comprised of glass, the first outer support connected to the top surface, and a second outer support comprised of glass, the second outer support connected to the bottom surface.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Aspects of the invention are directed to microdroplet generators and methods of manufacture thereof.

In conventional single-layer microfluidic devices, the number of inlets and outlets scales with the number of droplet generators, thus, creating a practical limit on the number of droplet generators that can be integrated onto a single device. The inventors have recognized that by incorporating a second layer of microfluidic channels to supply each droplet generator, large arrays of droplet generators can be operated using only a single set of inlets and outlets.

The inventors recognized that several disadvantages exist with conventional methods. For example, the low production rate of microfluidic devices (e.g., <10 mL/h) remains one of the key challenges in successfully producing commercial-scale manufacturing and production of microfluidic generated particles. Additionally, many conventional microfluidic devices are inoperable or are subject to defects under high temperatures (e.g., T<100° C.) and high pressures (e.g., P<60 psi). In particular industries, such as the food industry, conventional microfluidic devices may swell in the presence of food grade oils and food components like proteins, which may exhibit less ideal (rheological) behaviors, due to the interactions between the oils and/or food components with channel surfaces. The use of convention microfluidic devices in the pharmaceutical industry has resulted in similar problems, whereby certain pharmaceutical drugs or solvents are absorbed by the conventional microfluidic devices.

The inventors have thus recognized that it would be useful to provide an apparatus, as well as a process for manufacturing such an apparatus, that can undergo high temperatures and pressures as well as provide commercial-scale generation of, e.g., microdroplets and/or microbubbles. The inventors have further recognized that it would be useful to provide a microfluidic device comprised of materials which minimize or eliminate reactions or interactions with—and are substantially inert with respect to—broad classes of fluids used in connection with microdroplet and/or microbubble generation.

As used herein, the phrases “continuous phase” and “disperse phase” are used generically to describe the fluid the droplets are contained in and the fluid comprising the droplets, respectively.

As used herein, the term “fluid” is not limited to liquid substances, but may include substances in the gaseous phase.

Figure 1A:
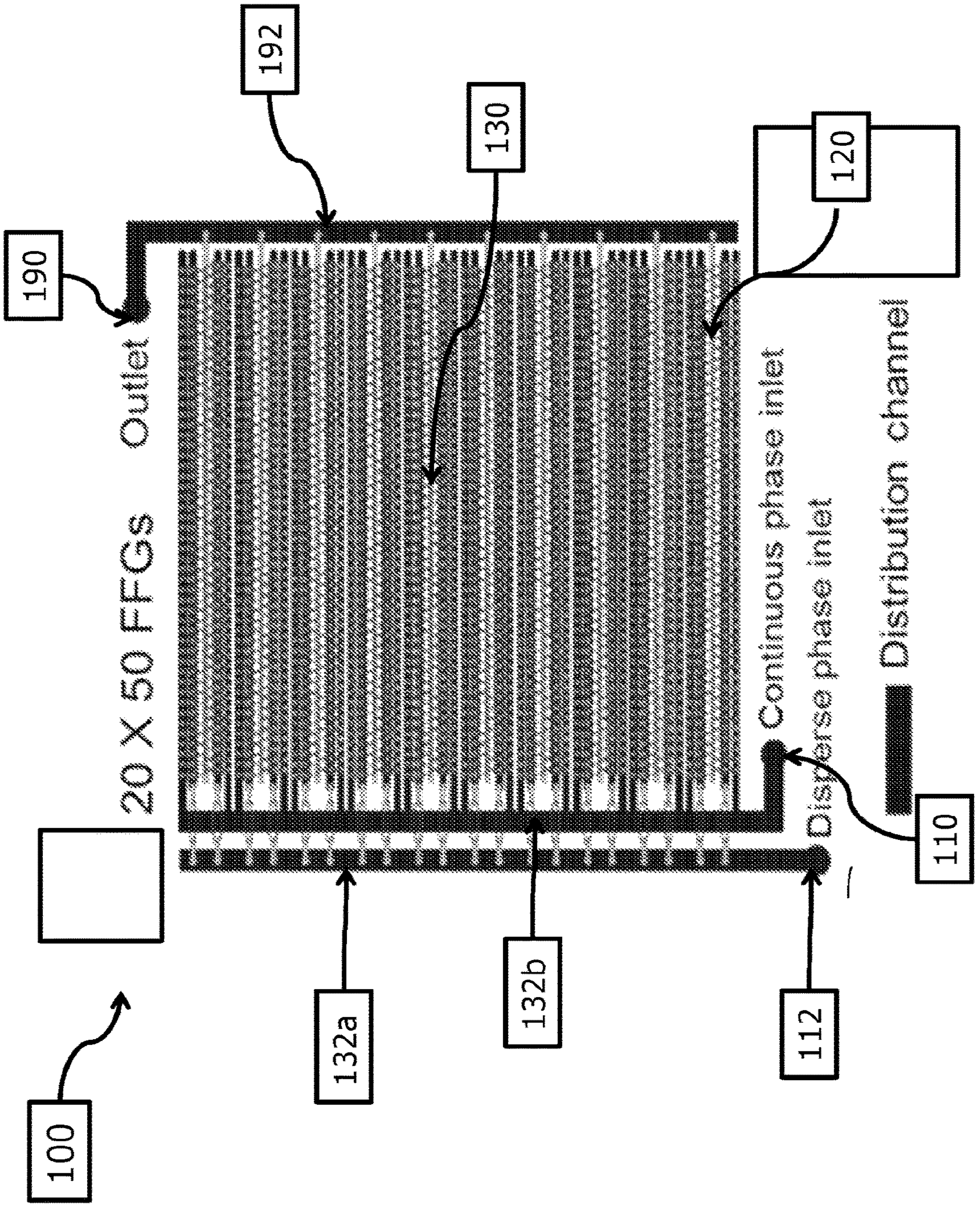
FIG. 1A is a schematic illustration of a microfluidic device according to aspects of the invention.
Figure 1B:
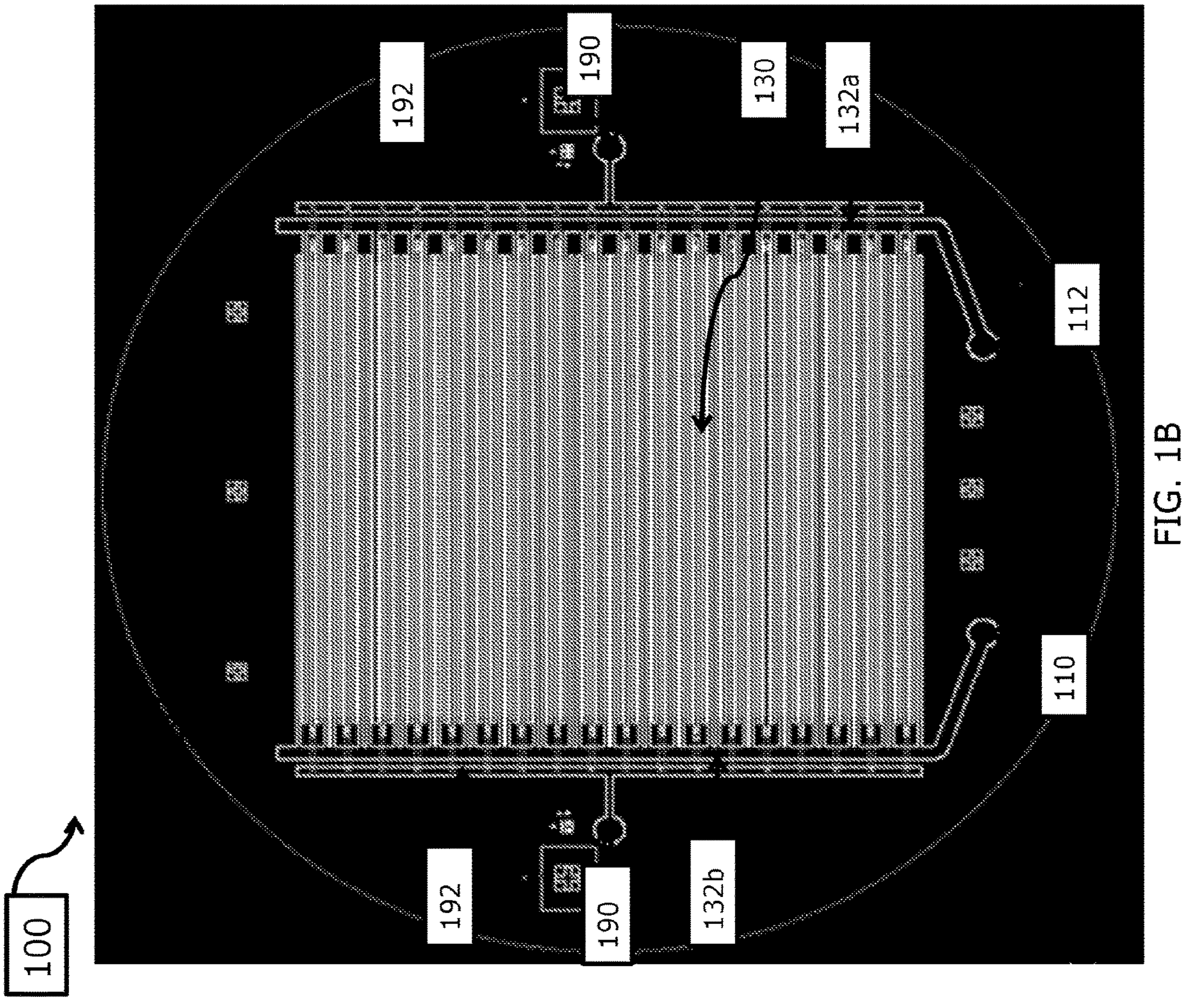
FIG. 1B is a schematic illustration of a microfluidic device having four inlets in accordance with aspects of the invention.

FIGS. 1A and 1B illustrate a microdroplet generator 100 for generating microdroplets on a commercial scale. As a general overview, microdroplet generator 100 includes a substrate 102 having defined therein an inlet 110 for receiving a continuous phase fluid; an inlet 112 for receiving a dispersed phase fluid; a plurality of droplet generators 120; a plurality of channels 130; and one or more outlets 190 for delivery of the microdroplets.

Figure 2B:
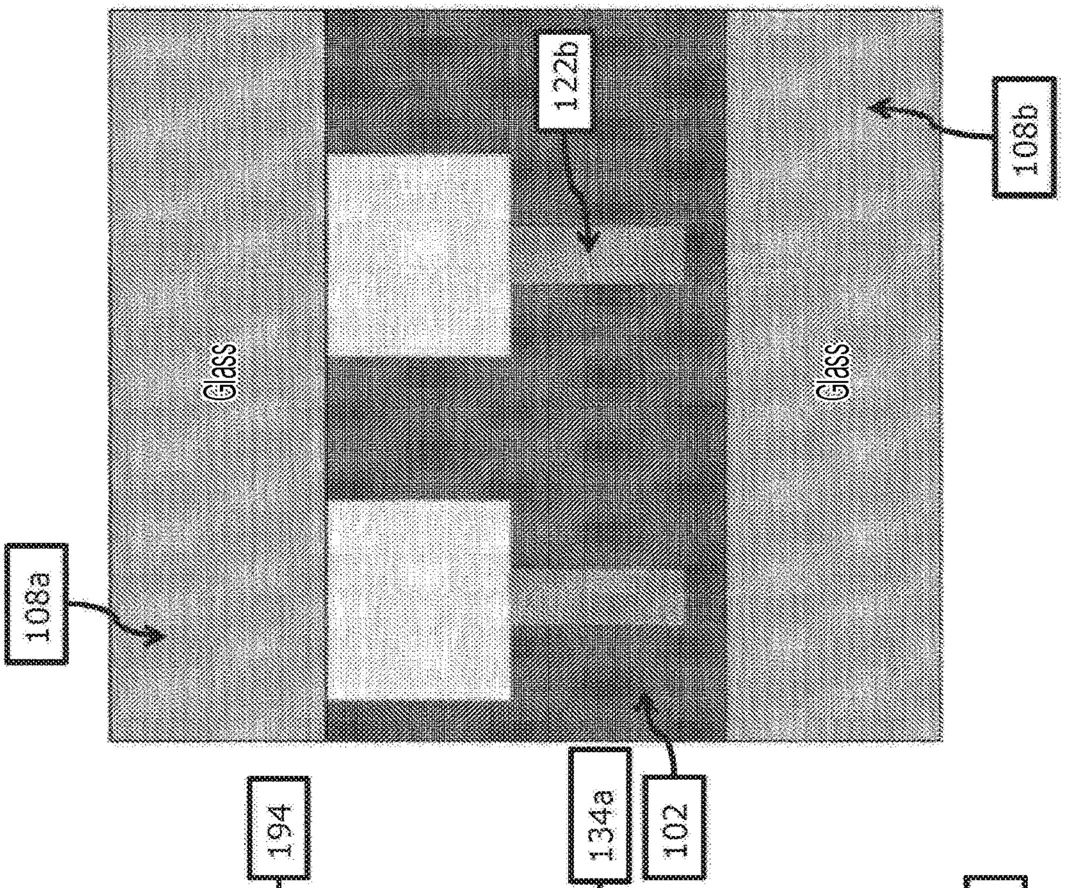
FIG. 2B is a schematic illustration of a cross-sectional view of a portion of the microfluidic device of FIG. 2A.
Figure 4B:
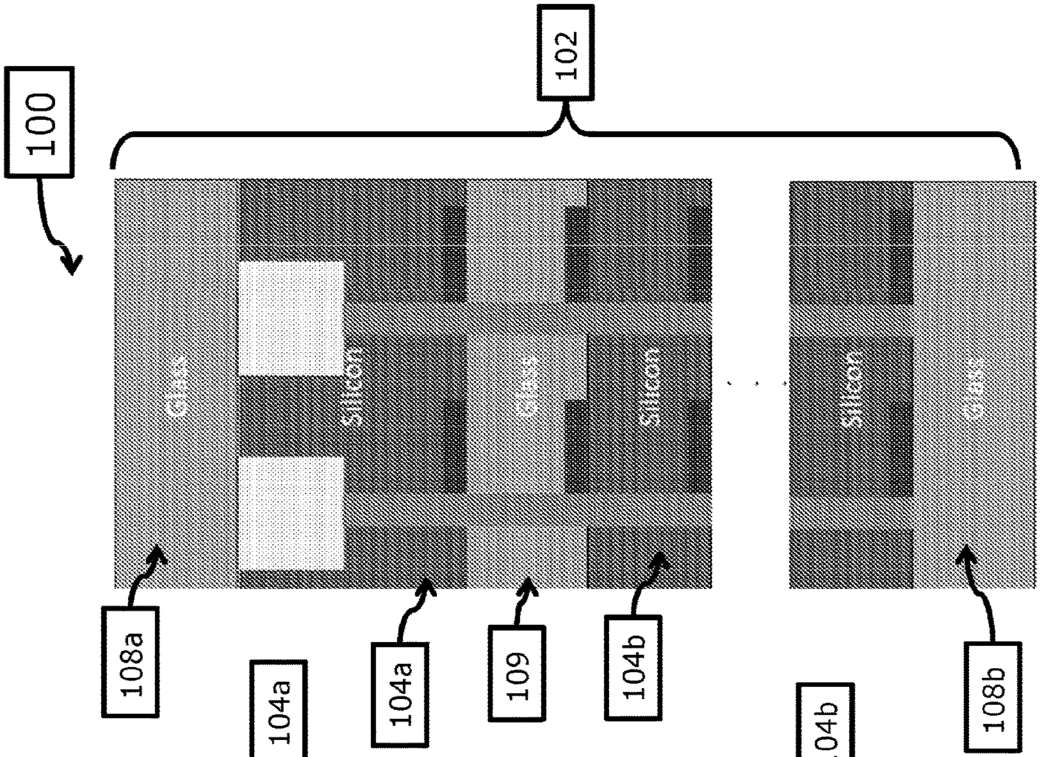
FIG. 4B is a schematic illustration of a cross-sectional view of a microfluidic device formed of more than one silicon wafer and having an inner support in accordance with aspects of the present invention.
Figure 4A:
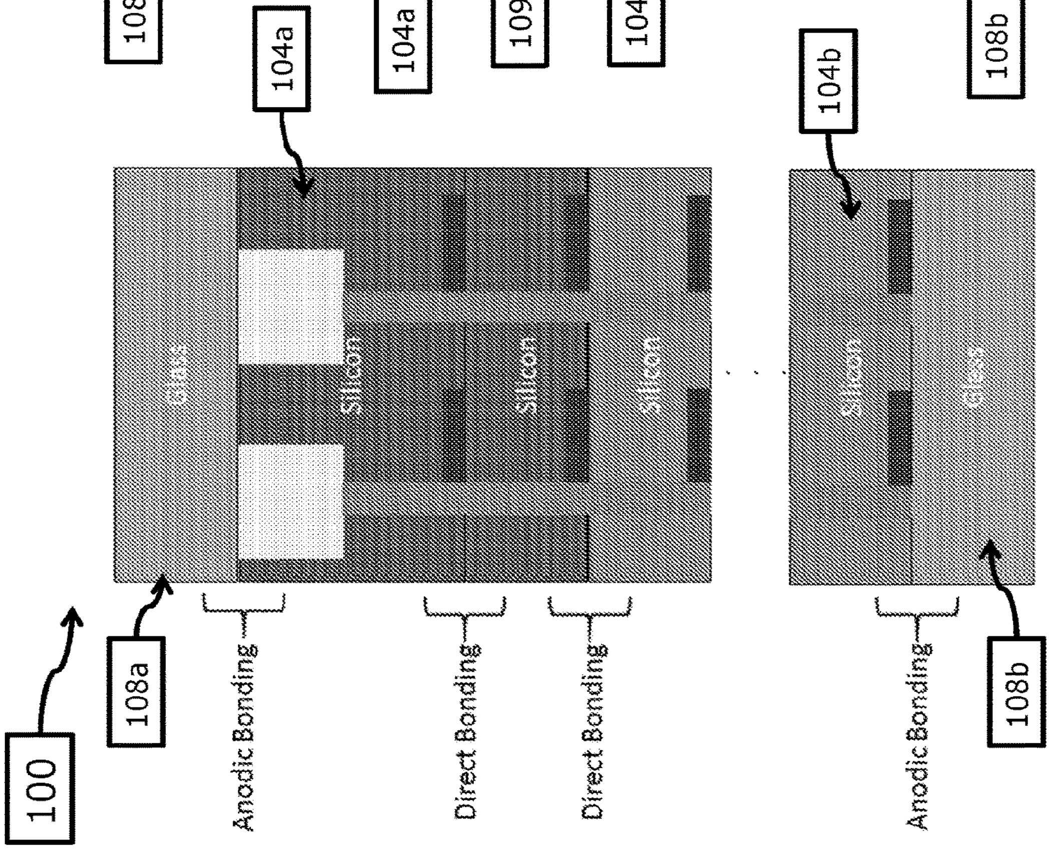
FIG. 4A is a schematic illustration of a cross-sectional view of a microfluidic device formed of more than one silicon wafer according to aspects of the present invention.

Microdroplet generator 100 includes at least one substrate 102. As depicted in FIGS. 2B, 4A, and 4B, substrate 102 may include one or more wafers 104. Substrate 102 and/or wafers 104 may define a substantially planar surface, e.g., top surface 105*a* and/or bottom surface 105*b* of wafer 104 may be substantially planer and/or flat. The wafers 104 of substrate 102 are preferably heat resistant, pressure resistant, and/or non-porous.

One of ordinary skill in the art, upon reading this disclosure, will understand that suitable materials for use as wafers 104 include any material which may be manipulated according to the microfluidic device manufacturing methods described herein (e.g., etching by deep reactive ion etching or advanced oxide etching) as well as be subject to high temperature and/or pressure and/or low interaction with the particular fluids to be used in the application (i.e., generation of microbubbles/microdroplets).

In one embodiment, wafers 104 may be silicon wafers, glass wafers, quartz wafers or the like. Substrate 102 may be formed of a single silicon wafer 104. In another embodiment, substrate 102 is formed of a plurality of wafers 104 that are bonded together, wherein at least one wafer 104 is silicon. Additionally or alternatively, substrate 102 may include two or more wafers 104 comprised of different materials, such as, e.g., at least one silicon wafer 104 and at least one glass wafer 104. Wafers 104 of substrate 102 may be bonded together by any suitable means, such as direct bonding, e.g., between two silicon wafers 104, and/or by anodic bonding, e.g., between a silicon wafer 104 and a glass wafer 104.

Substrate 102 of microdroplet generator 100 further includes one or more inlets 110 and 112, for receiving the continuous phase and the dispersed phase, and one or more outlets 190 for delivering the produced microdroplets. In one embodiment, microdroplet generator 100 has a single continuous phase inlet 110 and a single dispersed phase inlet 112. In another embodiment, the microdroplet generator 100 *t* includes a single outlet 190. In yet, another embodiment, the microdroplet generator 100 has more than one outlet 190, e.g., two outlets 190. As illustrated in FIG. 1B, microdroplet generator 100 may have more than one inlet 110 for receiving the continuous phase and more than one inlets 112 for receiving the dispersed phase.

Figure 2A:
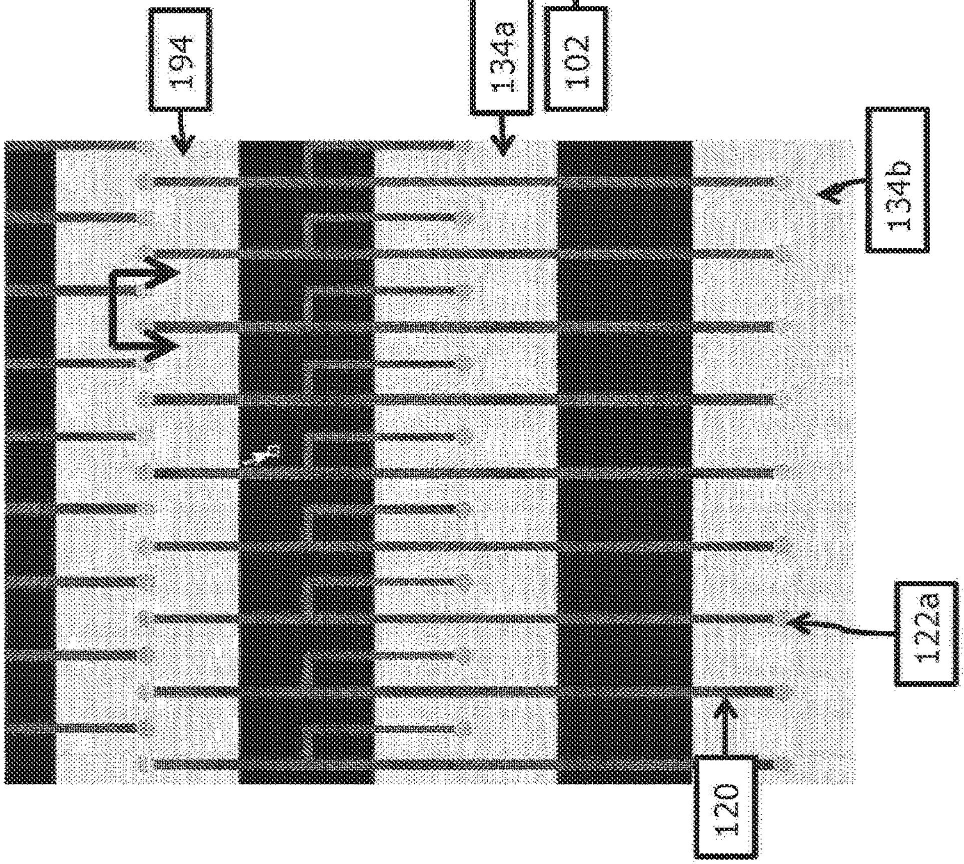
FIG. 2A is a schematic illustration of an enlarged portion of a microfluidic device having T-junction droplet generators according to aspects of the present invention.
Figure 2D:
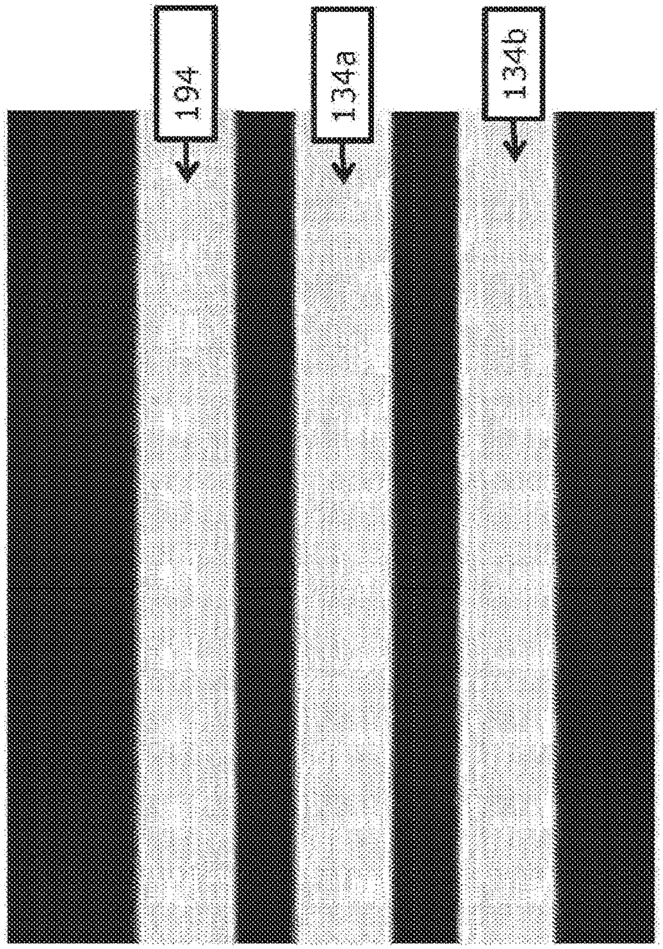
FIG. 2D is a schematic illustration of the channels of FIG. 2A.
Figure 2C:
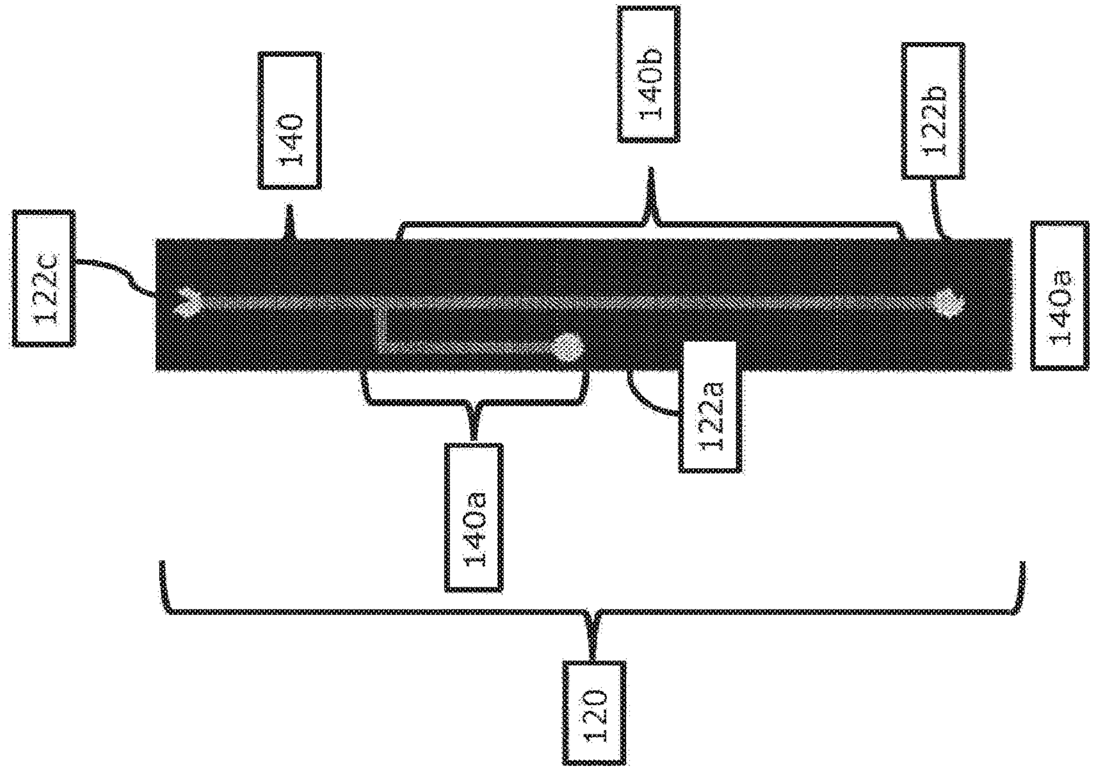
FIG. 2C is a schematic illustration of a droplet generator of FIG. 2A.
Figure 2E:
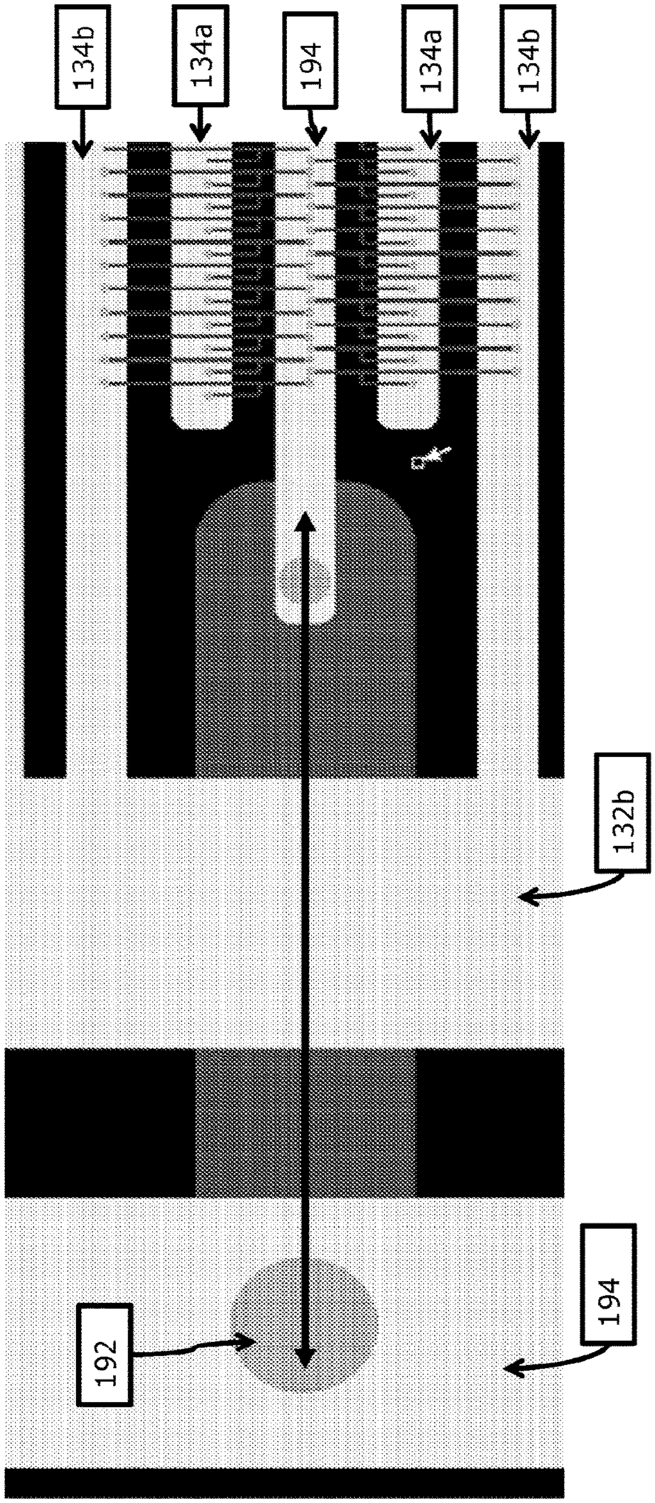
FIG. 2E is a schematic illustration of a portion of FIG. 2A.
Figure 2F:
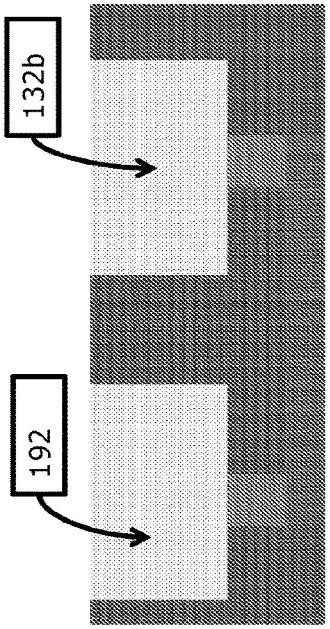
FIG. 2F is a cross-sectional view of the illustration of FIG. 2E.
Figure 3:
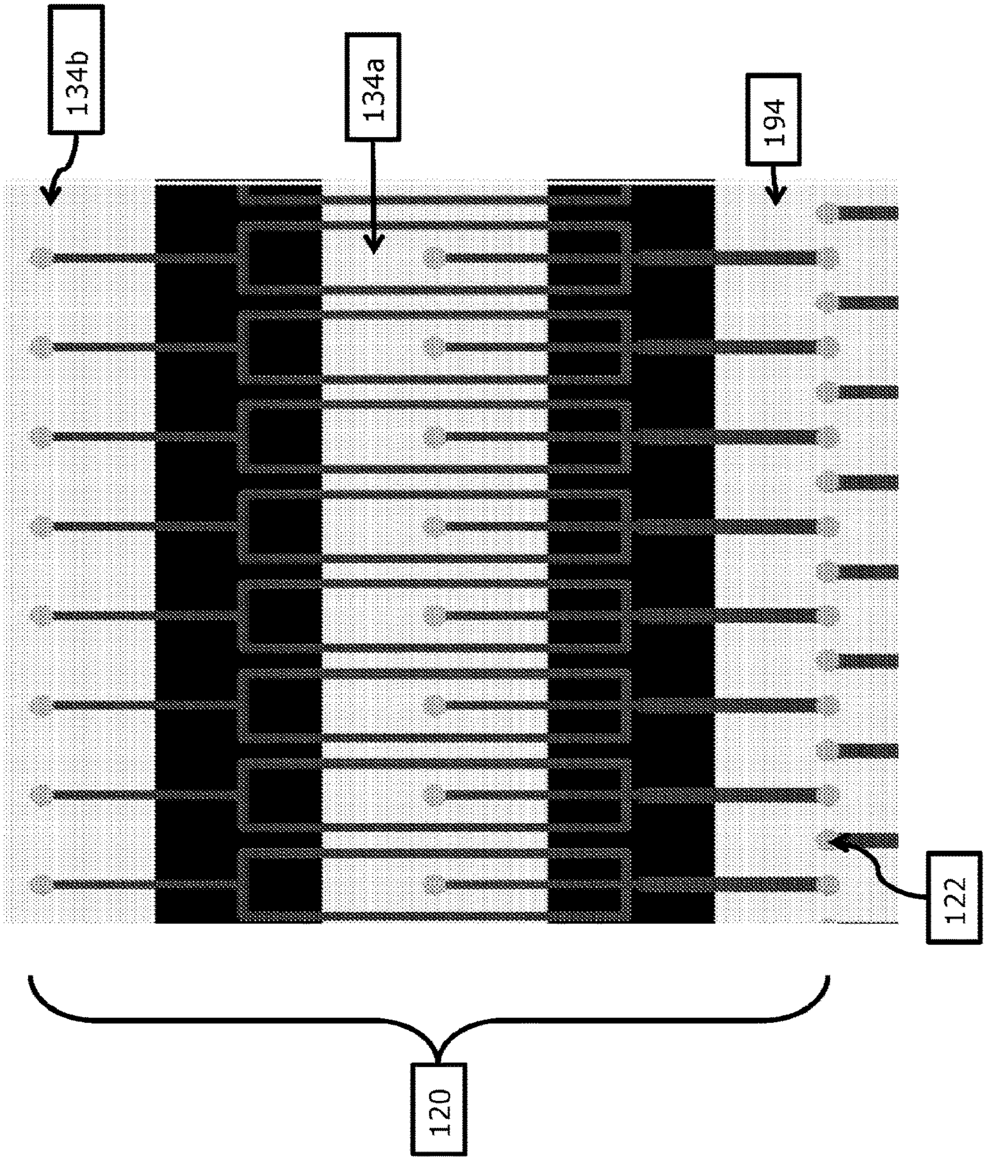
FIG. 3 is a schematic illustration of an enlarged portion of a microfluidic device having flow focusing droplet generators in accordance with aspects of the present invention.
Figure 11A:
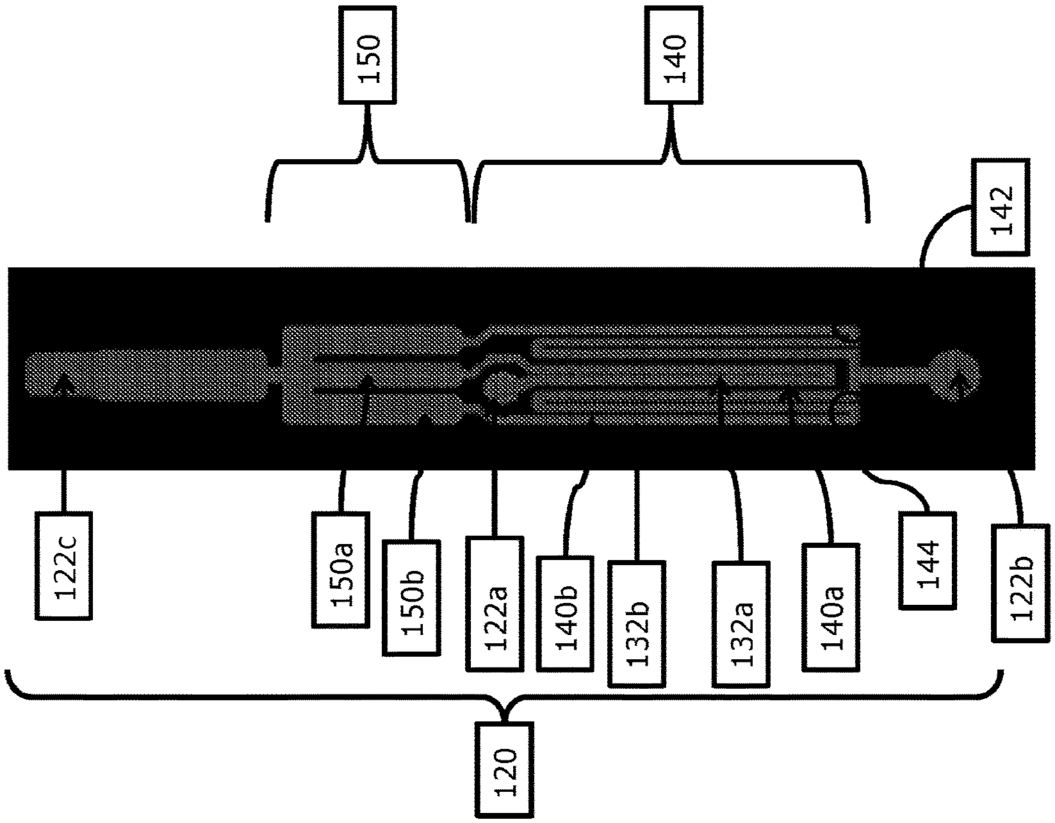
FIGS. 11A, 11B, and 11C are schematic illustrations of a first embodiment of microfluidic device having delivery channels that include a resistance increasing section and a velocity reduction section in accordance with aspects of the invention.
Figure 11C:
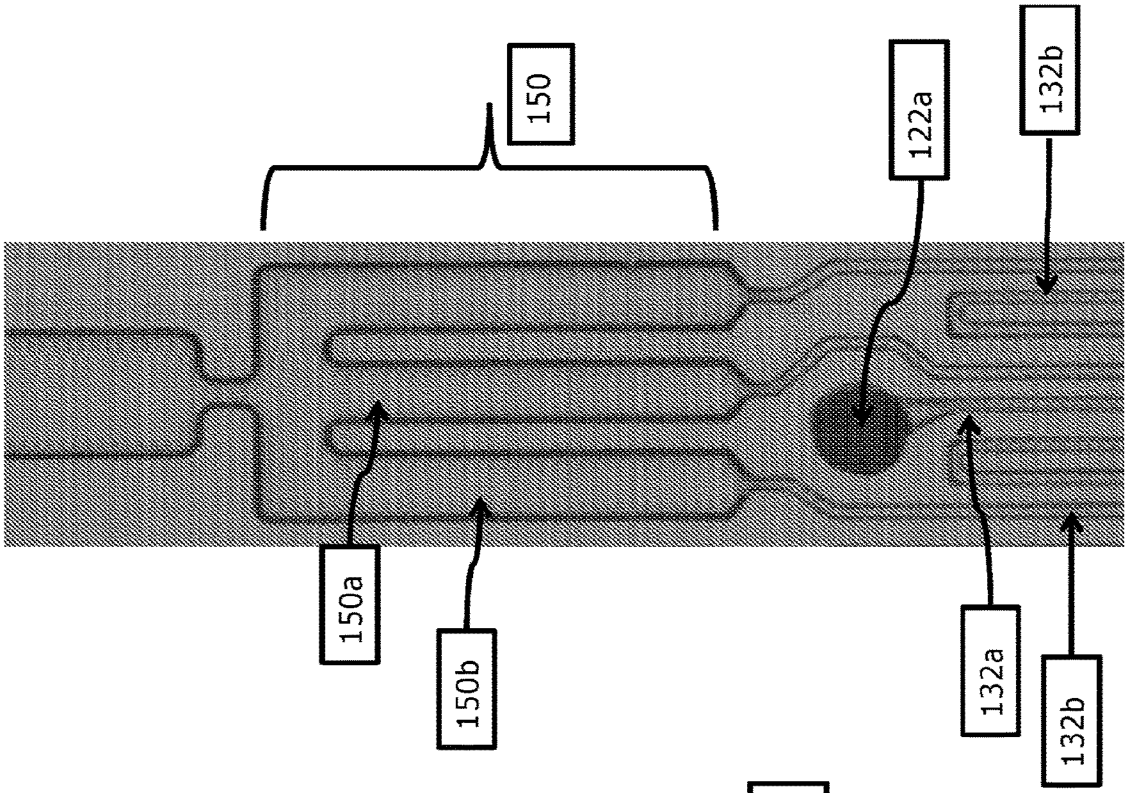
Figure 11B:
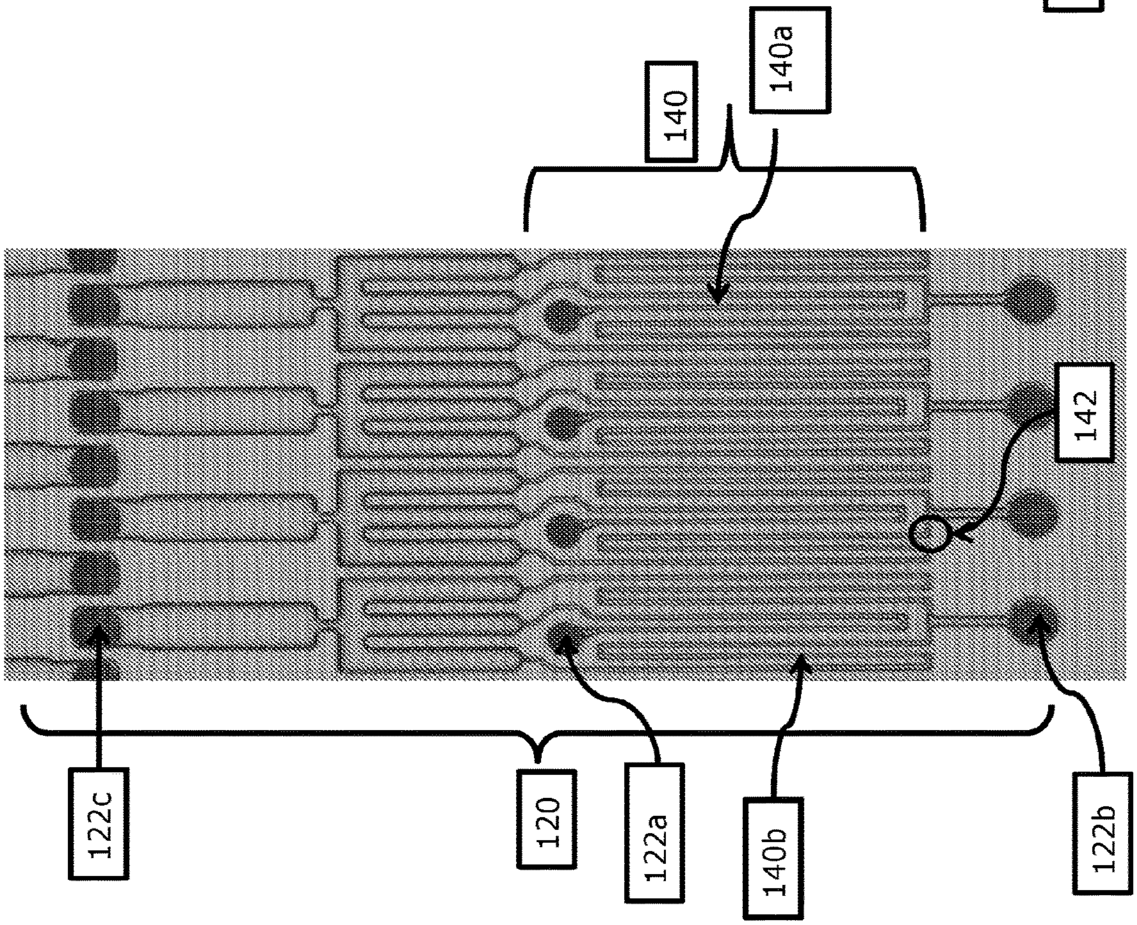
Figure 12A:
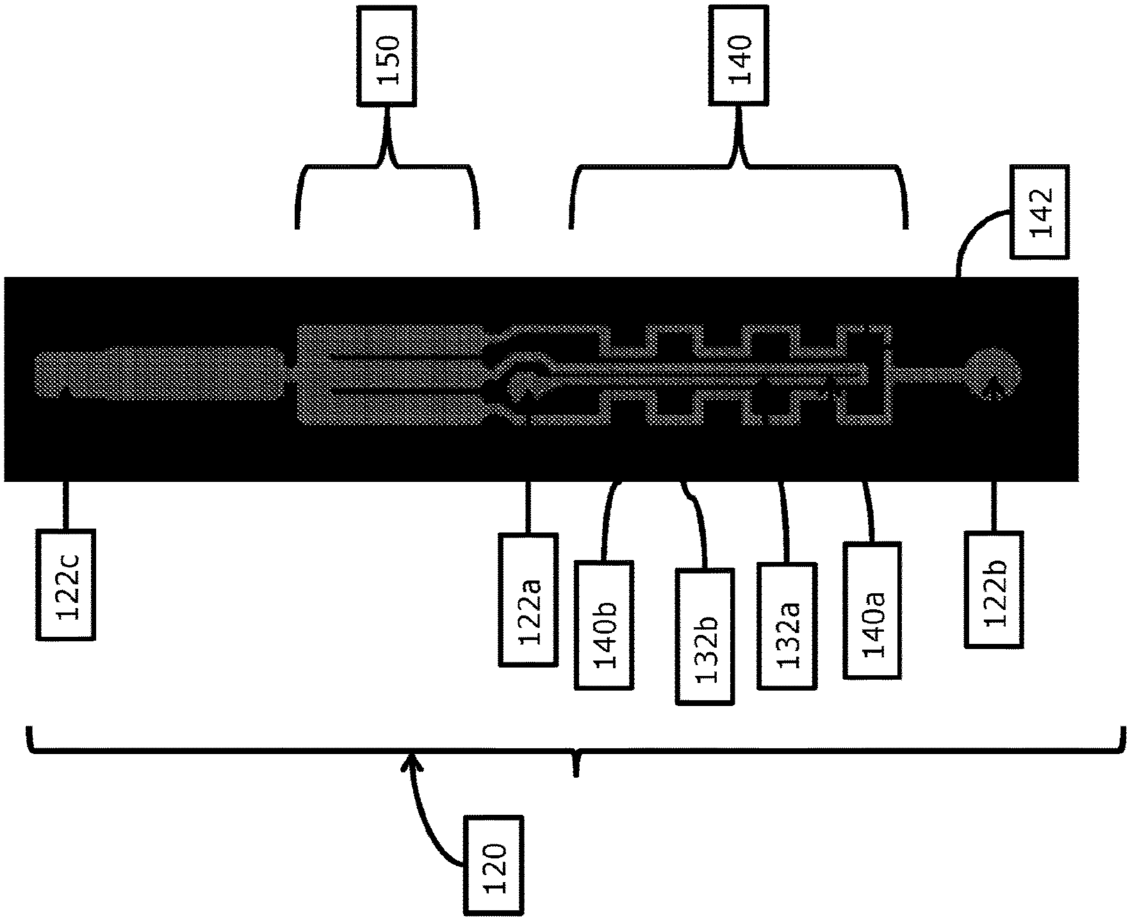
FIGS. 12A, 12B, and 12C are schematic illustrations of a second embodiment of microfluidic device having delivery channels that include a resistance increasing section and a velocity reduction section in accordance with aspects of the invention.
Figure 12C:
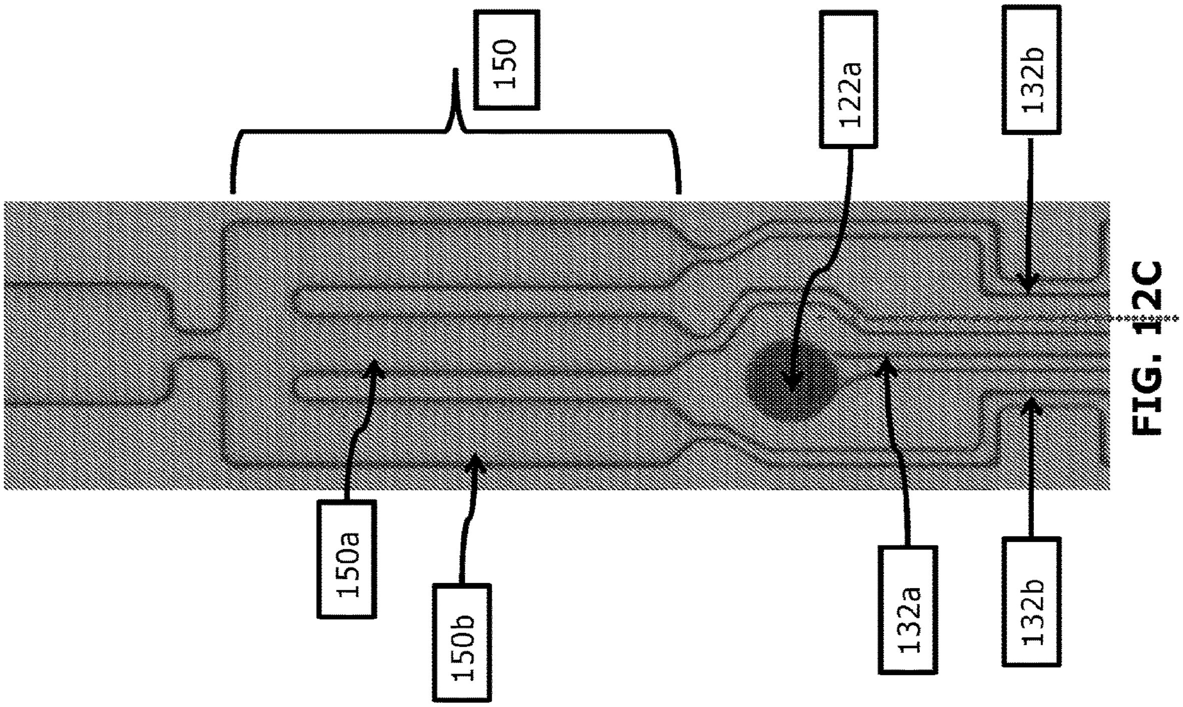
Figure 12B:
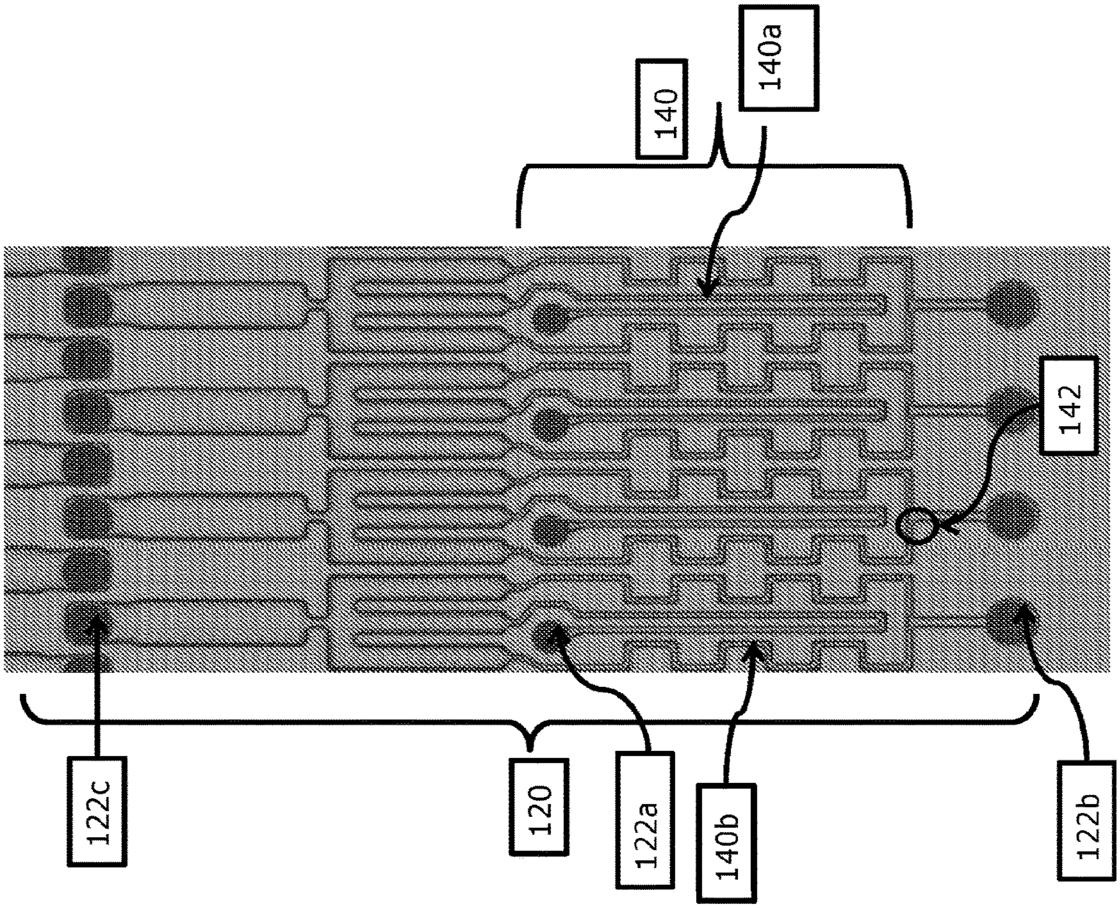

Microdroplet generator 100 includes a plurality of droplet generators 120, e.g., to mass produce emulsion droplets, vesicles, microbubbles, or the like. The droplet generators 120 may comprise any known droplet generator geometry. For example, the droplet generators 120 may be chosen from T-junction droplet makers (e.g., as illustrated in FIG. 2A), flow focusing droplet makers (e.g., as illustrated in FIG. 3, FIG. 11, FIG. 12), Janus particle droplet makers, multiple emulsion droplet makers, and combinations thereof. In at least one embodiment, droplet generators 120 may all be the same type of droplet makers, or may comprise at least two different types of droplet generators. In another embodiment, one or more of the droplet generators in a plurality of droplet generators 120 include an additional fluid inlet to create a multiple emulsion.

A number of the plurality of droplet generators may be more than two greater than a number of the one or more outlets for delivery of the microdroplets. In at least one embodiment, the microdroplet generator 100 may comprise at least 500 droplet generators 120, such as, for example, at least 1000 droplet generators 120, at least 10,000 droplet generators 120, at least 100,000 droplet generators 120, or at least 1,000,000 droplet generators 120. In at least one embodiment, microdroplet generator 100 comprises 500 to 5,000,000 droplet generators 120, such as, for example, from 1,000 to 2,000,000 droplet generators 120, or from 10,000 to 1,000,000 droplet generators 120.

Although droplet generators 120 are illustrated in FIGS. 2 and 3 as being in parallel, droplet generators 120 may be in series. Preferably, microdroplet generator 100 includes droplet generators 120 that are in parallel, e.g., in a ladder configuration, whereby droplet generators 120 are connected in parallel by way of the plurality of channels 130.

Microdroplet generator 100 includes a plurality of channels 130 configured to provide each droplet generator 120 with a disperse phase fluid and a continuous phase fluid, and to deliver the mixture, e.g., the emulsion or microdroplets, to outlet channel 192 and, ultimately, to outlet 190. For example, the plurality of channels 130 may be in fluid communication with the disperse phase inlet 112, the continuous phase inlet 110 and the outlet channels 192. As illustrated in FIGS. 2A-3, the plurality of channels 130 includes supply channels 132, delivery channels 134, and outlet channel 194. One or more portions of the plurality of channels 130, 132, 134, 194 may comprise a set of one or more channels.

The plurality of channels 130 may have a height at least 4 times greater than the height of the droplet generators 120. For example, the plurality channels 130 may have a height ranging from 4 to 100 times greater than the height of the droplet generators 120, such as, for example, from 4 to 50 times greater, from 5 to 25 times greater, or from 10 to 20 times greater.

The plurality of channels 130 may have a height of at least 200 μm, such as, at least 250 μm, at least 300 μm, at least 400 μm, at least 500 μm, or greater. For example, the plurality of channels 130 may have a height ranging from about 200 μm to about 1000 μm, such as from about 250 μm to about 500 μm or from about 300 μm to about 400 μm. In accordance with at least one embodiment, the droplet generators 120 may have a height of 40 μm or less, 30 μm or less, 25 μm or less, 20 μm or less, etc. In at least one embodiment, the droplet generators 120 have a height ranging from about 1 μm to about 40 μm, such as from about 5 μm to about 30 μm, or from about 10 μm to about 20 μm.

Desirably, the plurality of channels 130 is configured such that the flow rates in each droplet generator 120 is uniform to ensure uniformity in the distribution of droplet size. In one embodiment, uniform droplet formation is obtained using a ladder geometry, where the spine of the ladder is formed by at least two supply channel 132*a* and 132*b* and the rungs of the ladder are formed by the delivery channels 134*a* and 134*b*. Although the delivery channels 134 are illustrated in FIG. 1A-1B as perpendicular to supply channels 132, delivery channels 134 may not perpendicular to supply channels 132, but may be angled with respect to supply channels 132. The delivery channels 134 are coupled to be in fluid communication with droplet generators 120 by way of vias (e.g., through-holes 122*a, b*). Once droplets are generated, the droplets flow into the outlet channels rows 194 by way of vias (e.g., through-holes 122*c*) to outlet channel 192 to outlet 190.

To avoid an intersection between the dispersed phase supply channels 132*a* and outlet collection channel 194 an underpass channel may be incorporated in a side of the wafer 105*a* (FIG. 1B). In another embodiment, the underpass channel may be incorporated in the second support layer 108*b*. Similarly, to avoid an intersection between the continuous phase supply channels 132*b* and outlet channel rows 194 an underpass channel may be incorporated in a side of the wafer 105*a*. In another embodiment, the underpass channel may be incorporated in the second support layer 108*b*.

In another embodiment, the underpass channels may be used to connect dispersed phase supply channels 132*a*, continuous phase supply channels 132*b* to dispersed delivery channels 134*a*, and continuous phase delivery channels 134*b*. In this case, the underpass channels aids in avoiding intersection between the outlet channel 192 and 134*a*, 134*b*. In yet another embodiment, the underpass channel may be used only for one the fluidic inlet supply channel phases 132*a* and/or 132*b* as shown in FIG. 1A.

Preferably, the hydrodynamic resistance of the supply channels 132 is insignificant compared to that of the droplet generators 120. Additionally or alternatively, the pressure drop along the supply channel 132 remains small compared to the pressure drop across the individual droplet generators 120, such that $P_{supply\ channel} < P_{droplet\ generators}$.

The microdroplet generator 100 may be designed such that Equation 1 is satisfied.

$$2N_{dg}(R_{dc}/R_{dg})<0.01 \qquad \text{(Equation 1)}$$

where $R_{dc}$ is the fluidic resistance along the delivery channel 134 between each droplet generator 120, $R_{dg}$ is the fluidic resistance of individual droplet generators 120, and $N_{dg}$ is the number of droplet generators 120 in one row (FIG. 2A). The flow resistance of each rectangular channel can be estimated using $R=12\ \mu l/wh^3$, where p is the dynamic viscosity of the fluid and w, h, and l are the width, height, and length of the channel. In one embodiment, height h is less than width w.

To evenly distribute flow to each of the delivery channels 134, the resistance (Rsc) of the supply channel 132 and the total resistance of each delivery channel 134 ($R_{dc}$) is considered. Preferably, the resistance $R_{sc}$ of the supply channel 132 is less than each of the associated resistances Rdc of the connected delivery channels 134, thereby promoting even distribution to each delivery channel 134. Additionally or alternatively, the resistance ($R_{oc}$) of the outlet channel 192 may be less than the resistance ($R_{or}$) of each of the connected outlet channel rows 194.

In one embodiment, the supply channels 132 have a width of 2 mm, height of 0.4 mm, and length of 70 mm; the continuous phase delivery channels 134*b* have a width of 400 um, height of 400 um, and length of 55 mm; the dispersed phase delivery channels 134*a* have a width of 400 um, height of 400 um, and length of 55 mm; and the outlet channels 194 have a width of 400 um, height of 400 um, and length of 55 mm. The dimensions of the microdroplet generator (e.g., as depicted in FIG. 2 and FIG. 3) 120 may have a width 10 um, height of 8 um, and length of 2000 um for the continuous phase 140*b;* 10 um width, height of 8 um, and 300 um in length for the dispersed phase 140*a*. Based on these dimensions, up to 42,857 droplet generators 120 may be connected to each pair of delivery channels 134*a* and 134*b*. For example, if the maximum number of pairs of delivery channels 134 is 64, then 2,742,848 droplet generators 120 may be in fluid communication with such delivery channels 134.

Microdroplet generator 100 is configured for commercial-scale manufacturing or generation of microdroplets and/or microbubbles. Microfluidic devices employing microdroplet generator 100 are configured to produce more than 10 mL/hr. For example, microfluidic devices employing microdroplet generator 100 may produce more than 10 L/hr, preferably 50 L/hr or more, more preferably 70 L/hr or more, more preferably 80 L/hr or more, more preferably 90 L/hr or more, and more preferably 100 L/hr or more.

Microdroplet generator 100 is configured to be pressure resistant, such that microdroplet generator 100 is operable with fluids under high pressure. For example, microdroplet generator 100 may be operable with a dispersed phase fluid and/or a continuous phase fluid under a pressure of 60 psi or greater, preferably 100 psi or greater, more preferably 200 psi or greater, more preferably 400 psi or greater, more preferably 800 psi or greater, more preferably 1000 psi or greater, more preferably 1500 psi or greater, more preferably 3000 psi or greater, more preferably 4000 psi or greater, more preferably 5000 psi or greater, more preferably 6000 psi or greater, more preferably 7000 psi or greater, and more preferably 8000 psi or greater. Microdroplet generator 100 is operable with fluids under high pressure such that microdroplet generator 100 does not deform as a result of pressurizing the fluids.

Microdroplet generator 100 is also configured to be heat resistant, such that microdroplet generator 100 is operable with a dispersed phase fluid and/or a continuous phase fluid that has been heated. Preferably, microdroplet generator 100 is operable with a fluid that has a temperature of 100° C. or higher, more preferably 150° C. or higher, more preferably 200° C. or higher, more preferably 300° C. or higher, more preferably 400° C. or higher, and more preferably 500° C. or higher. Microdroplet generator 100 is considered operable with a heated fluid, if microdroplet generator 100 does not deform as a result of the heated fluid flowing through microdroplet generator 100.

Microdroplet generator 100 may be non-porous, such that microdroplet generator 100 may be used with non-polar molecules without being deformed. For example, microdroplet generator 100 may be employed in the pharmaceutical industry and/or food industry for screening food components, such as food grade oils and proteins, and/or active drug ingredients, such as small non-polar molecules.

Microfluidic devices, according to one embodiment of the invention, may include one or more supports 108 and/or 109 to provide additional strength, pressure resistance, and/or heat resistance. In one embodiment, the supports 108 and/or 109 are a formed of a material that is heat resistant, pressure resistant, and non-porous. One or more of the supports 108 and/or 109 may be substantially planer, e.g., to provide a substantially planer and/or flat surface. The supports 108 and/or 109 may be connected to microdroplet generator 100 by way of bonding to one or more wafers 104 of substrate 102. For example, the supports 108 and/or 109 may be bonded to wafers 104 by way of anodic bonding, direct bonding, or the like.

Outer supports 108 may be connected to and/or contact an outer surface (e.g. top surface 105*a* of wafer 104 and/or bottom surface 105*b* of wafer 104) of the microdroplet generator 100 and may function as an outer wall or periphery of the microdroplet generator 100. For example, outer support 108 may be formed of glass and employed as an outer wall of microdroplet generator 100 to reduce the cost of manufacture. Outer supports 108 may define one or more apertures in fluid communication with the inlet 110 for receiving the continuous phase fluid and/or with the inlet 112 for receiving the dispersed phase fluid.

The microfluidic device may also include an inner support 109 that is connected to and/or contacts an inner surface, e.g., a surface 105 of an inner wafer 104 of microdroplet generator 100. Inner support 109 defines one or more apertures in fluid communication with the plurality of channels 130.

Figure 5:
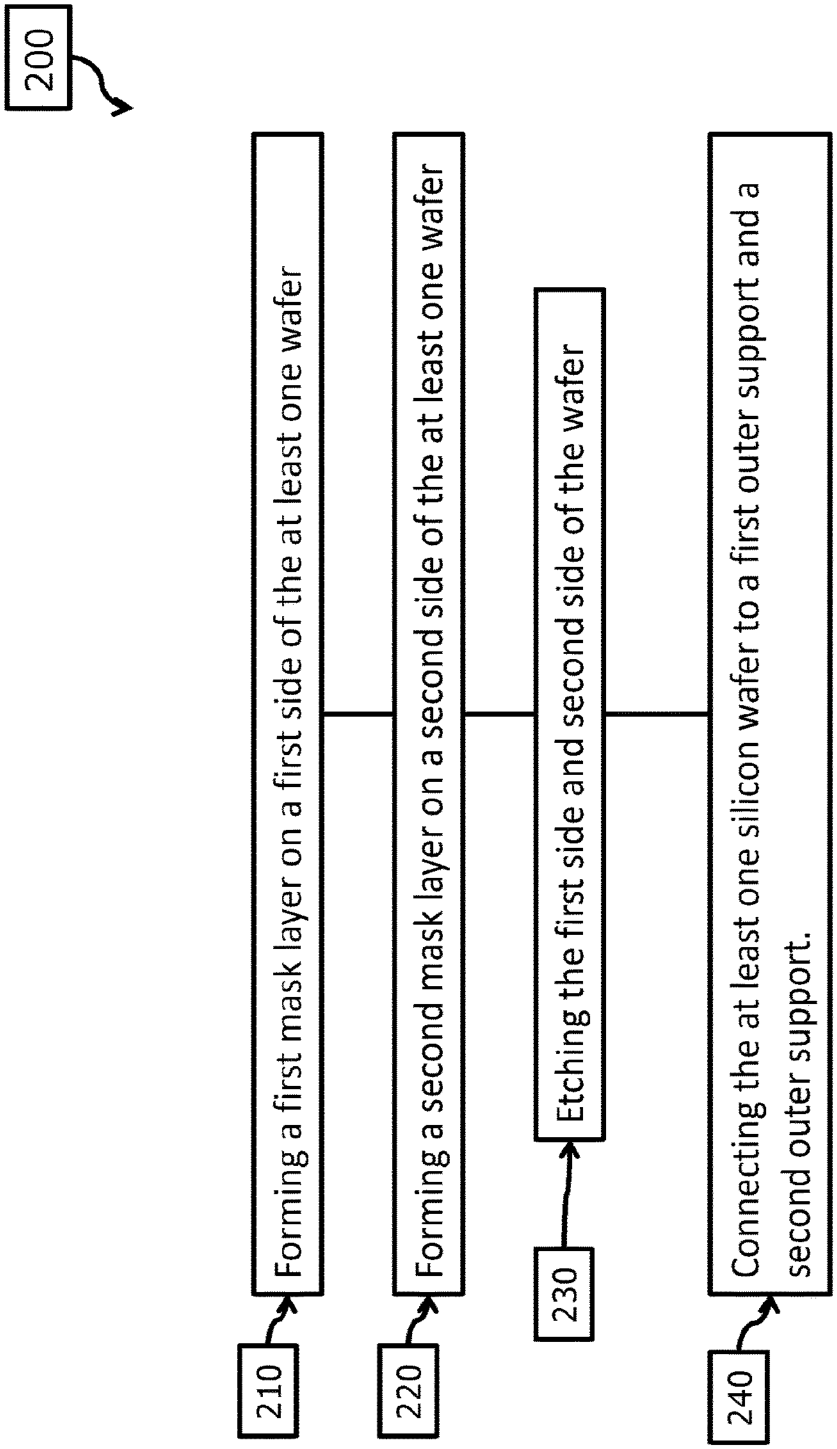
FIG. 5 is a schematic depicting a method for manufacturing a microfluidic device from at least one silicon wafer according to aspects of the present invention.

FIG. 5 depicts a non-limiting method 200 for producing microfluidic devices using one or more microdroplet generators (e.g., microdroplet generator 100). Method 200 produces microdroplet generator 100 from a substrate 102 comprising at least one wafer 104. In one embodiment, method 200 forms a microdroplet generator 100 from a single wafer 104.

FIGS. 11A-C and 12A-C illustrate two embodiments of a droplet generator 120 having a resistance increasing section 140 and a velocity reduction section 150. The embodiments illustrated in FIGS. 11A-C and 12A-C include a dispersed phase resistance increasing section 140*a* coupled to a dispersed phase inlet through-hole 122*a*, such that the droplet generator 120 is in fluid communication with the dispersed phase inlet through-hole 122*a*. The illustrated embodiments also include a continuous phase resistance increase section 140*b* coupled to a continuous phase inlet through-hole 122*b*, such that the droplet generator 120 is in fluid communication with the continuous phase inlet through-hole 122*b*. Although the fluid flowing through the delivery channels 134 of the microfluidic devices of FIGS. 11A-C and 12A-C pass first through the resistance increasing section 140 and subsequently through the velocity reduction section 150, other embodiments may include solely the resistance increasing section 140 or the velocity reduction section 150.

The resistance increasing section 140 includes at least one elbow turn (e.g., elbow turn 142) configured to increase the fluid flow resistance through the resistance increasing section 140*a*, 140*b*. As used herein, an elbow turn refers a change in the fluid flow direction that produces a fluid flow resistance effect similar to a substantially 90° elbow joint. In one embodiment, two elbow turns 142 may be positioned near one another to form a “U-turn” (e.g., U-turn 144). The length of dispersed phase resistance increasing section 140*a* in droplet generator 120; length of continuous phase resistance increasing section 140*b* in droplet generator 120 (FIG. 11A-C, FIG. 12A-C) may be adjusted to desired resistance needed to generate uniform flow rate across all droplet makers.

Although the resistance increasing section 140*a* of the dispersed phase has less elbow turns 142 than the resistance increasing section 140*b* of the continuous phase, the continuous phase resistance increasing section 140*b* may be configured to have at least the same number of elbow turns 142 as the dispersed phase resistance increasing section 140. In one embodiment, the ratio of elbow turns 142 in the dispersed phase resistance increasing section 140*a* to the continuous phase resistance increasing section 140*b* is at least 2:1. In another embodiment, the ratio of elbow turns 142 in the dispersed phase resistance increasing section 140*a* to the continuous phase resistance increasing section 140*b* is at least 6:1. In yet another embodiment, the ratio of elbow turns 142 in the dispersed phase resistance increasing section 140*a* to the continuous phase resistance increasing section 140*b* is from 2:1 to 6:1.

The velocity reduction section 150 has a larger cross-sectional area than other sections/portions of the resistance increasing section 140. The velocity reduction section 150 is configured to reduce the velocity of the fluid flowing there through. For example, the cross-sectional area of the velocity reduction section 150*a* and/or 150*b* may be, e.g., at least 5%, at least 10%, at least 20%, at least 200%, at least 300%, at least 400%, at least 500%, at least 600%, at least 700% larger than the cross-sectional area of the resistance increasing section 140 of dropletmaker 120. The velocity of the fluid flowing through the velocity reduction section 150 may be 50% or less than the velocity of the fluid flowing through the resistance increasing section 140*a*, 140*b*. The length of the channel for velocity reduction section 150*a* and/or 150*b* may be adjusted in order to get fully developed laminar flow. The length may be calculated as L=(Dh)*0.065*Re, where Dh is hydrodynamic radius of channel at 150, Re is the Reynolds number of flow in channel 150.

The microfluidic device 100 may be hydrophilic in nature. Thus, in one embodiment, to convert the microfluidic device 100 to hydrophobic for the generation of water in oil droplets, a silane treatment may be applied. For example, 1 ml of dicholodimethyl silane may be added to 40 ml ethanol and passed through the microfluidic device 100 for 10 minutes from each inlets 112 and 110 to convert the plurality of channels 130 and droplet generator 120 to be hydrophobic.

As a general overview, method 200 includes forming a first mask layer 106 on a first side of the at least one silicon wafer 104; forming a second mask layer 106 on a second side of the at least one silicon wafer 104; etching the first side and the second side of the at least one silicon wafer 104; forming additional mask layers to produce desired configurations (e.g., droplet generators 120); and coupling the at least one silicon wafer 104 to a first outer support 108*a* and a second outer support 108*b*. One or more of the steps of method 200 may be omitted and/or repeated and/or performed in order (including simultaneously) that may vary from those disclosed herein without deviating from the scope and spirit of the present invention.

In step 210, a first mask layer 106 is formed on a first side of the at least one wafer 104. The mask layer 106 may be formed of any suitable material. In one embodiment, the mask layer 106 is formed from DOW SPR 220™, which is a photo-resistive polymer, or by spray coating photo-resistive polymer Shipley S1805. The first mask layer 106 may be applied to wafer 104 by spin coating or other methods for applying mask layer 106. After spin coating or other suitable methods of application, the masking material may be dried and/or baked to form mask layer 106. The mask layer 106 may have a thickness that is suitable for the intended method of etching.

In step 220, a second mask layer 106 is formed on a second side of the at least one wafer 104. The second mask layer 106 may be formed in a similar manner as the first mask layer 106. Additionally or alternatively, the second mask layer 106 may be formed prior to, during, or after the formation of the first mask layer 106.

In step 230, the first and second side of the at least one wafer 104 is etched. Etching of the wafer 104 may be completed by way of plasma etching or wet etching. Isotropic or anisotropic etching may be employed. Preferably, wafer 104 is etched by deep reactive ion etching or advanced oxide etching. In one embodiment, the first and the second sides are etched after the formation of the first and second masks. In another embodiment, the first side is etched after the formation of the first mask and the second side is etched after the formation of the second mask. In accordance with this embodiment, the first side may be etched again during the etching of the second side.

Method 200 may include forming additional mask layers 106, e.g., a third mask layer, a fourth mask layer, a fifth mask layer, etc., to produce the desired configuration for the substrate 102. For example, depending on the etching techniques performed, the material of the wafer 104, and/or the thickness of the mask layer 106, steps 210 through 230 may be repeated, in no specific order, to produce the features of microdroplet generator 100 for the microfluidic device.

In step 240, the at least one silicon wafer 104 is connected to a first outer support 108*a* and a second outer support 108*b*. The silicon wafer 104 and the first outer support 108*a* may be connected directly, e.g., by anodic bonding and/or direct bonding. The second outer support 108*b* may be connected to the opposed side of the at least one silicon wafer 104, e.g., to enclose or seal the plurality channels 130 and/or to form a casing to protect microdroplet generator 100. In one embodiment, where wafer 104 is silicon and outer support 108 is glass (e.g., BOROFLOAT® 33 glass or other glass that has same thermal expansion coefficient as Silicon wafer 104), anodic bonding is employed to connect wafer 104 to outer support 108. In another embodiment, where wafer 104 is silicon and outer support 108 is also silicon, direct bonding is preferably employed to connect wafer 104 to outer support 108.

Figure 6:
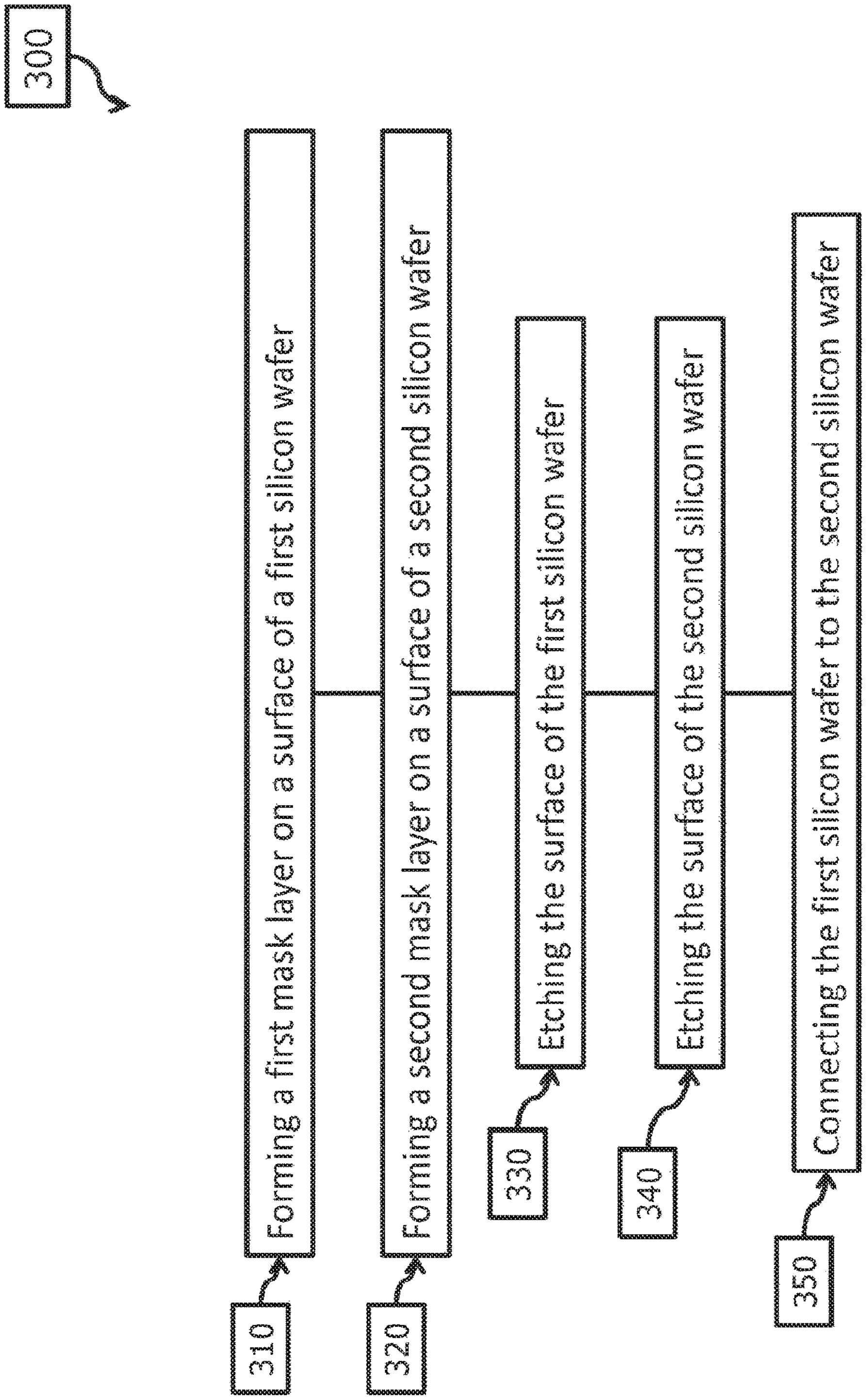
FIG. 6 is a schematic depicting another method manufacturing a microfluidic device from at least two wafers in accordance with aspects of the present invention.
Figure 7B:
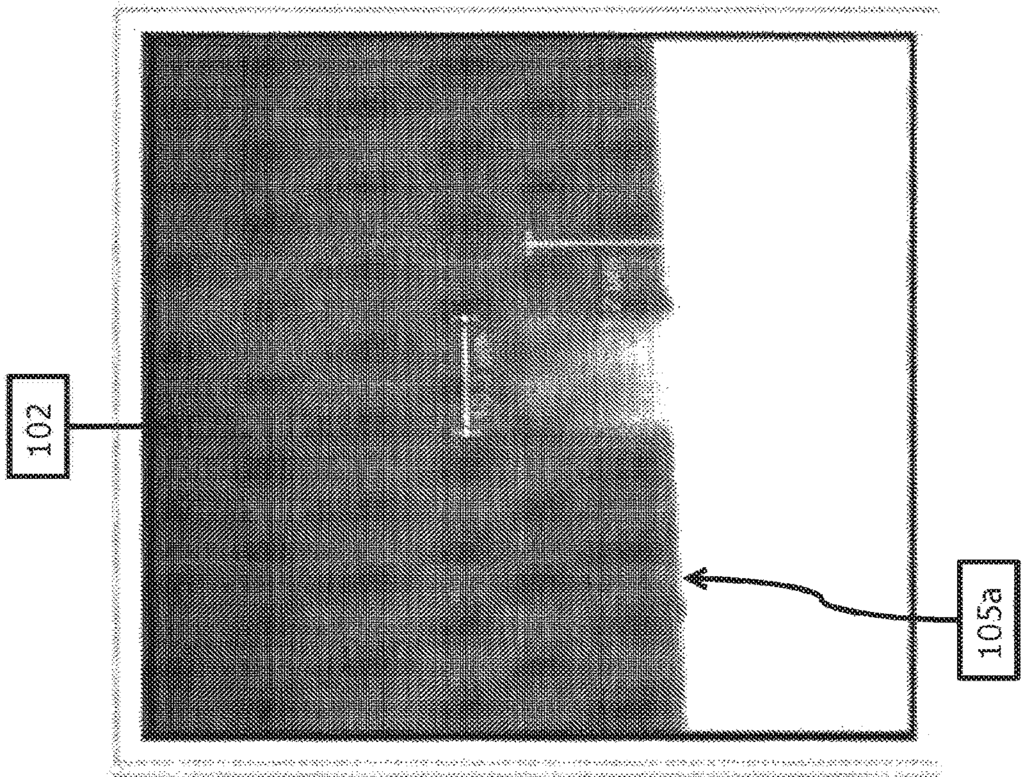
FIG. 7B is a cross-sectional view of a channel of the microfluidic device of FIG. 7A.
Figure 7A:
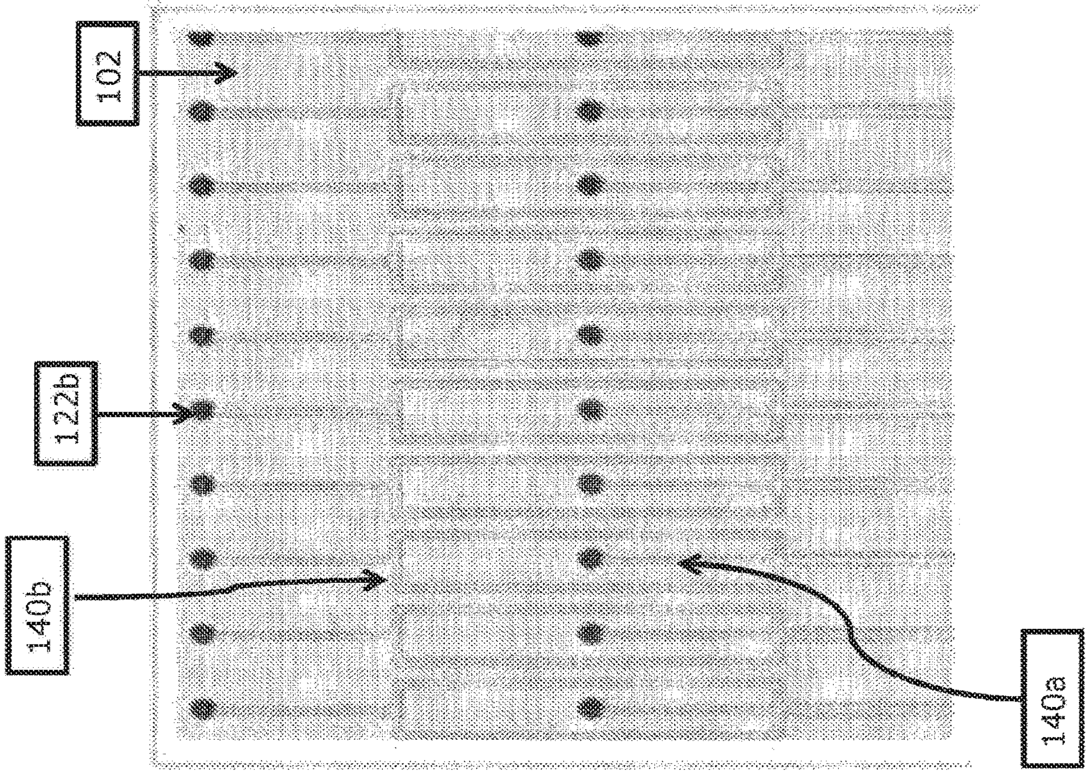
FIG. 7A is a top view of a portion of a microfluidic device formed by etching a wafer according to aspects of the present invention.

FIG. 6 depicts another non-limiting method 300 for producing microfluidic devices using one or more microdroplet generators (e.g., microdroplet generator 100). Method 300 may produce microdroplet generator 100 from a substrate 102 comprising two or more wafers 104.

As a general overview, method 300 includes forming a first mask layer 106 on a surface 105 of a first silicon wafer 104*a*; forming a second mask layer 106 on a surface 105 of a second silicon wafer 104*b*; etching the surface 105 of the first silicon wafer 104*a*; etching the surface 105 of the second silicon wafer 104*b*; and connecting the first silicon wafer 104*a* to the second silicon wafer 104*b*.

In steps 310 and 320, a first mask layer 106 is formed on a first silicon wafer 104*a* and a second mask layer 106 is formed on a second silicon wafer 104*b*. The first and second mask layers 106 may be formed by way of methods similar those employed to form a mask layer 106 in method 200. Additional mask layers 106 may be formed on either the first silicon wafer 104*a* and/or the second silicon wafer 104*b* and subsequently etched without any particular limitation with regard to the order of formation or etching of the additional mask layers 106.

In steps 330 and 340, the surface 105 of the first silicon wafer 104*a* and the surface 105 of the second silicon 104*b* wafer are etched. Etching of the first wafer 104*a* may occur before, during, or after etching of the second wafer 104*b* in a manner similar to step 230 of method 200.

In step 350, the first silicon wafer 104*a* is connected to the second silicon wafer 104*b*. The first wafer 104*a* may be connected to the second wafer 104*b* by direct bonding or anodic bonding. Preferably, where the first wafer 104*a* and the second wafer 104*b* are silicon, the two wafers 104 are connected by direct bonding. Finally, wafers 104*a* and 104*b* may be bonded to glass wafers by anodic bonding.

Example

The following example is a non-limiting embodiment of the present invention, included herein to demonstrate the advantageous results obtained from aspects of the present invention.

Figure 8A:
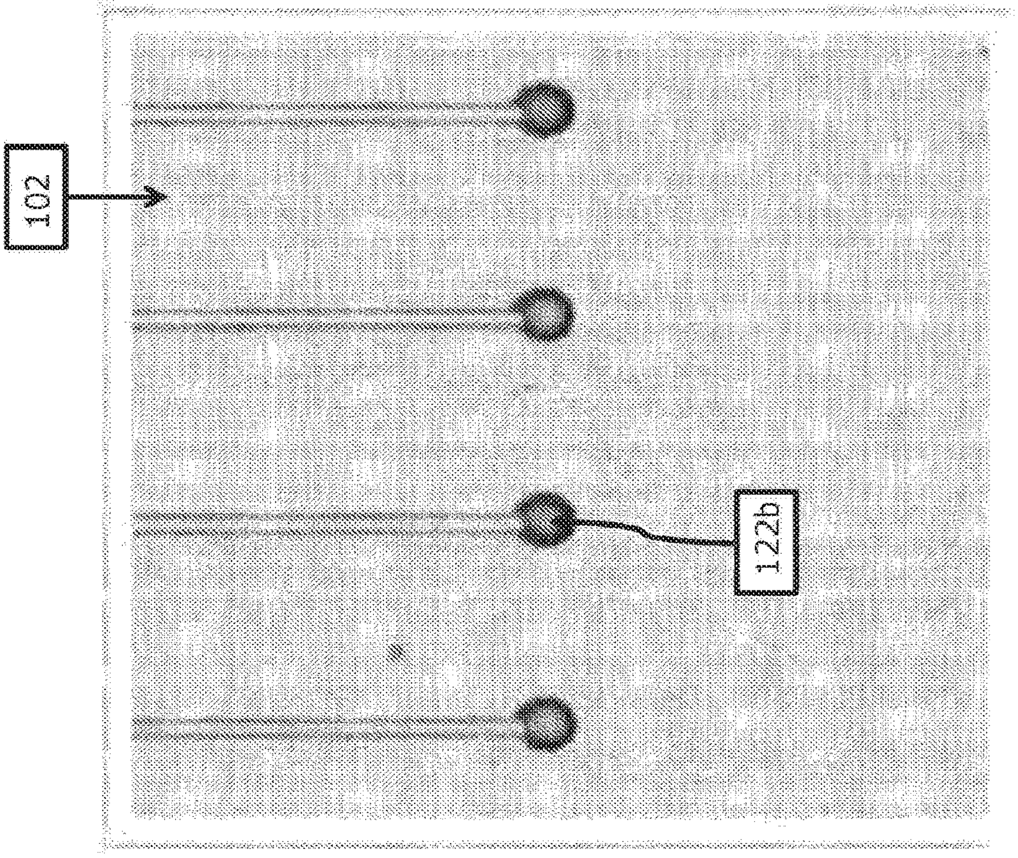
FIG. 8A is an enlarged top view of vias of the microfluidic device of FIG. 7A.
Figure 8B:
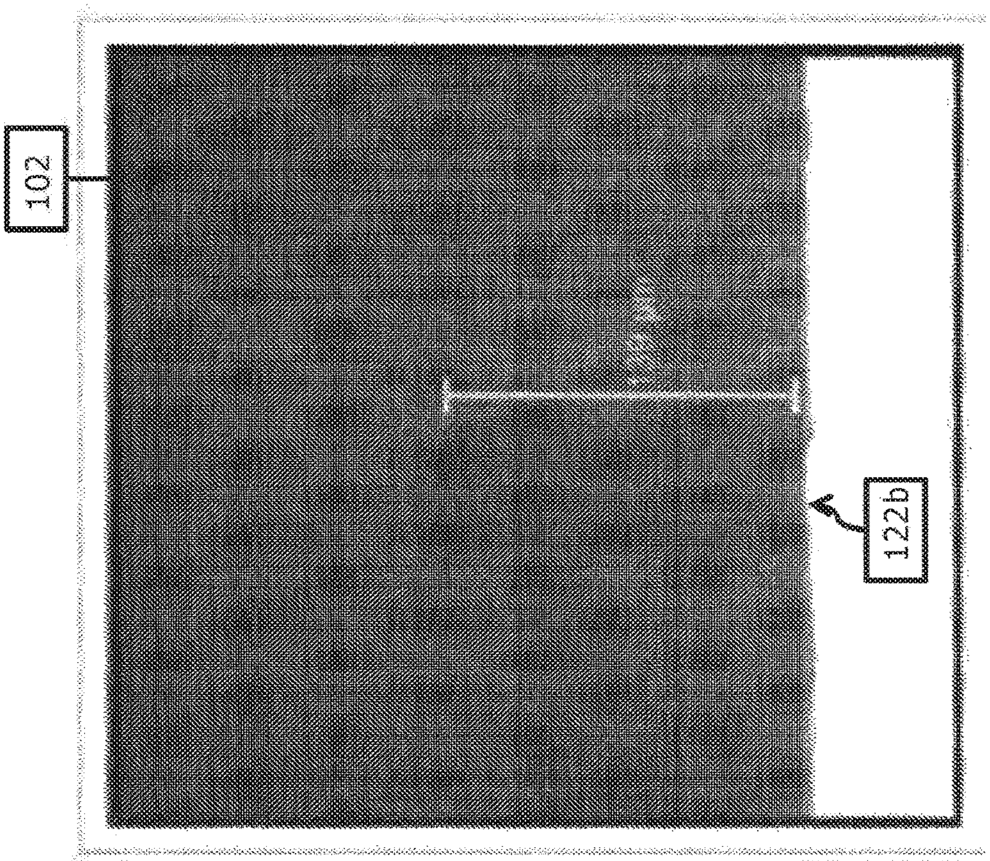
FIG. 8B is a cross-sectional view of the vias of FIG. 8A.
Figure 9A:
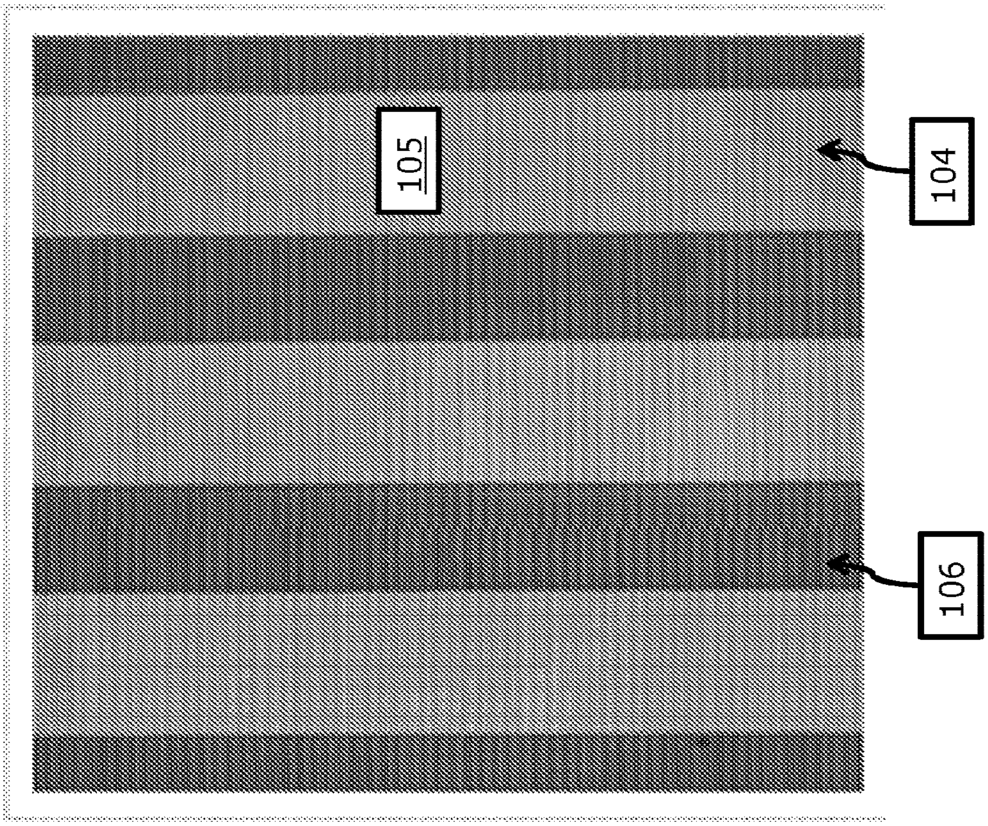
FIG. 9A is top view of a masking layer for forming channels in a wafer in accordance with aspects of the present invention.
Figure 9B:
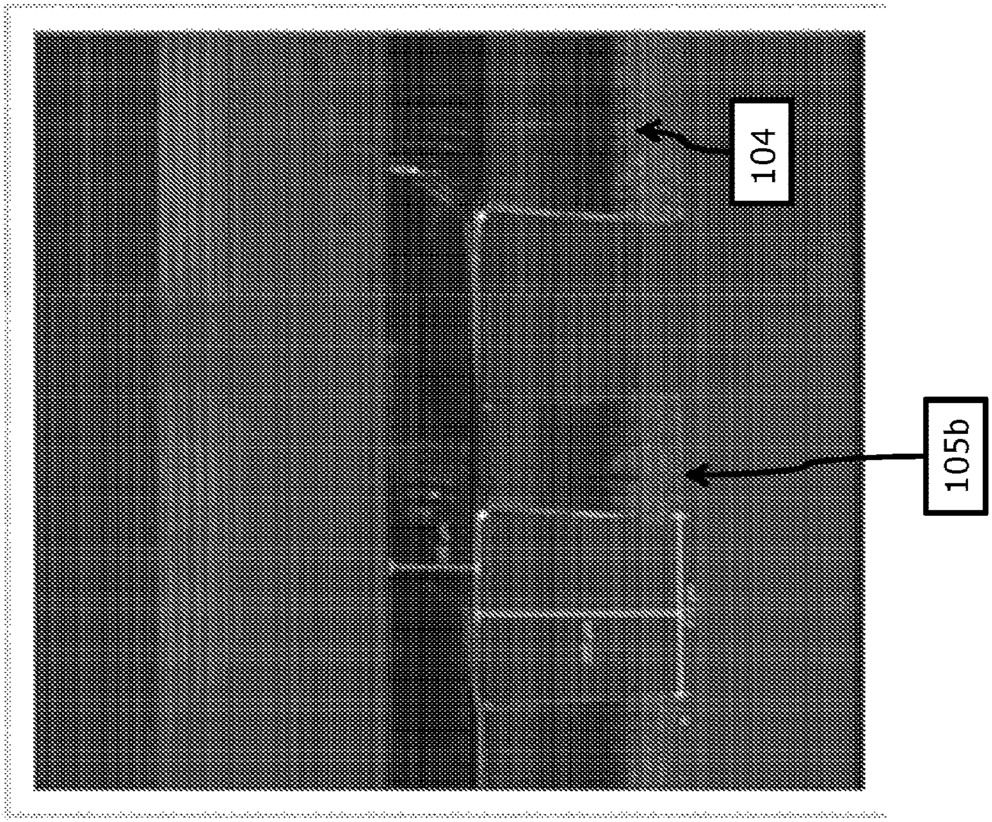
FIG. 9B is a cross-sectional view of a channel formed by etching the wafer with the masking layer of FIG. 9A.
Figure 10A:
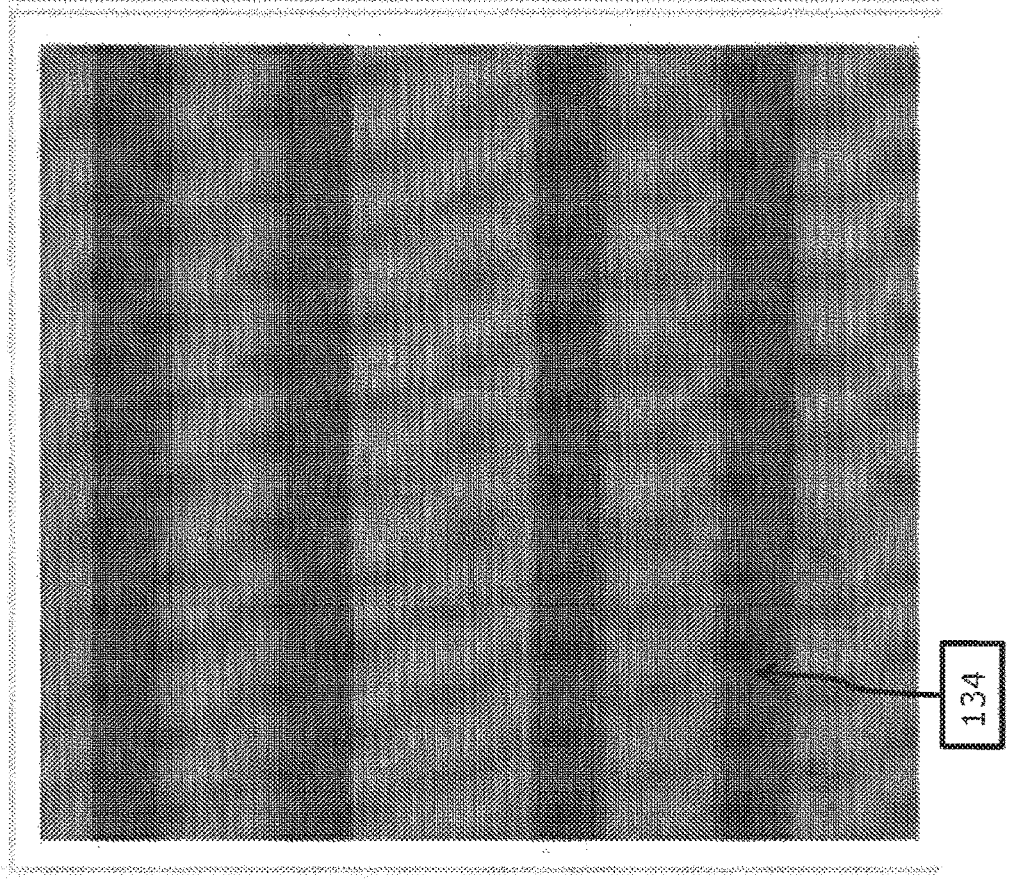
FIG. 10A is an image of a portion of a plurality of delivery channels and vias of a microfluidic device according to aspects of the present invention.
Figure 10B:
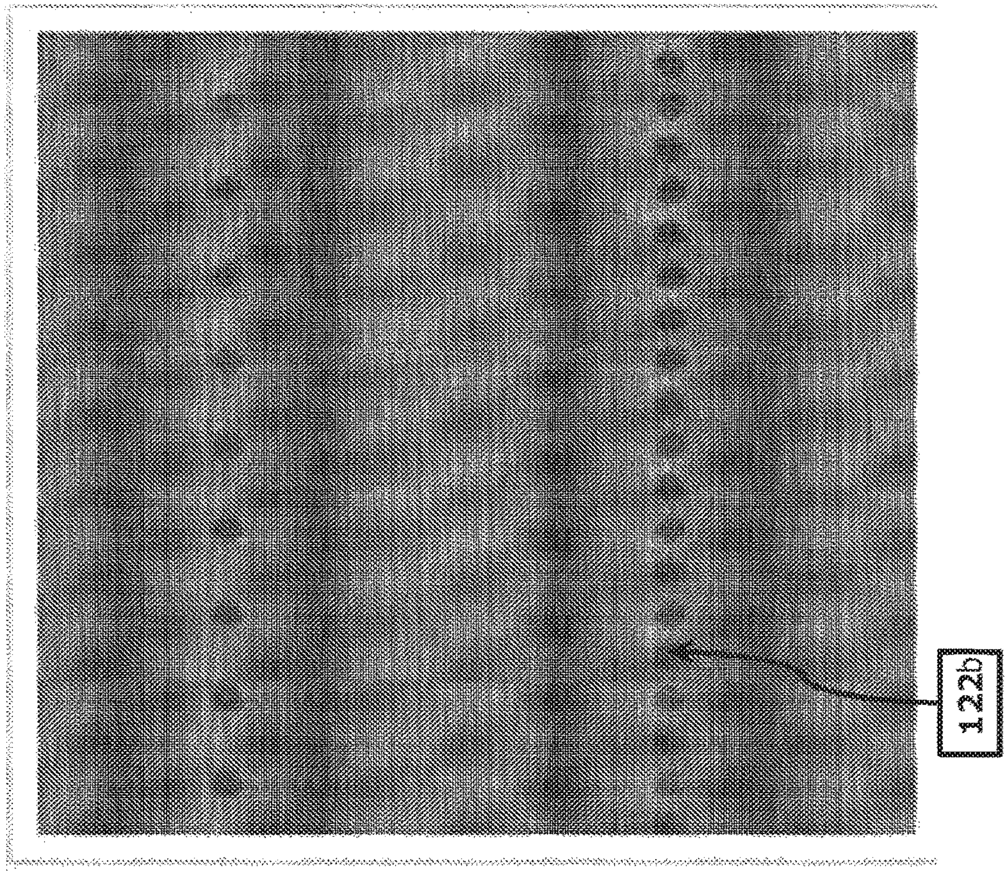
FIG. 10B is a second image of the portion of the plurality of delivery channels and vias of the microfluidic device of FIG. 10A.

Microdroplet generators were fabricated on a 4 inch silicon wafer using deep reactive ion etching (hereinafter "DRIE"). First, a 6 um thick layer of DOW SPR 220 RESIST™ was spin coated onto a top side of the silicon wafer, soft baked, and exposed with mask droplet generators. The patterns were developed in MF 26A™ developer, the developed patterns were then etched for 10 um deep in DRIE, as shown in FIGS. 9A-9B. Subsequently, the back side of the wafer was spin coated with a 12 um thick layer of DOW SPR 220 RESIST™, soft baked, and exposed to produce mask layers for producing supply and delivery channels. The patterns for the supply and delivery channels were developed and etched in DRIE for ~400 um deep. Additionally, the top side of the wafer was again coated with 11 um thick layer of DOW SPR 220 RESIST™, soft baked, and exposed with mask to produce vias. Images of the channels and vias may be seen in FIGS. 7A, 7B, 10A, and 10B. The patterns were developed and etched in DRIE using a carrier wafer with a depth of ~130 um, as shown in FIGS. 8A-8B. The silicon wafers were then anodic bonded on top and bottom to two BOROFLOAT® 33 glass wafers. The outer supports, which were glass wafers, were machined with a laser for input and output connections to the plurality of channels. The silicon wafers of the substrate were then be bonded with each other using a direct bonding technique.

Stacking multiple silicon and BOROFLOAT® ×wafers allows for the fabrication of microfluidic devices having a number of droplet generators much greater than 10,000. Additionally, techniques for multiple stacking allows microfluidic devices to have more than 1 million droplet generators by stacking multiple microdroplet generators sequentially.

The process in this Example was used to produce the following two configurations. In the first configuration, multiple silicon wafers were etched with vias and droplet generators using standard DRIE technique as mentioned before. The top silicon wafer was bonded to another silicon wafer with only delivery channels or with delivery via droplet generators using a direct bonding technique. Subsequently, the entire stack was be bonded to BOROFLOAT® 33 glass wafers, which had inlet and outlet channels, and as a base for the entire stack of wafers.

In the second configuration, vias and droplet generators were etched on to a silicon wafer using DRIE technique, and into BOROFLOAT® 33 using Advanced Oxide Etch (hereinafter "AOE") techniques. Silicon and glass wafers were bonded using anodic bonding.

What is claimed:

1. A microfluidic device, comprising:

at least one first channel train in fluid communication with and associated with a first inlet, the first inlet being configured to receive a continuous phase fluid, at least one second channel train in fluid communication with and associated with a second inlet, the second inlet being configured to receive a dispersed phase fluid;

at least one product generator configured to produce a product from the continuous phase fluid and the dispersed phase fluid, the at least one product generator being in fluid communication with the at least one first channel train and the at least one second channel train, the at least one product generator comprising a first channel that receives continuous phase fluid of the first channel train and a second channel that receives dispersed phase fluid of the second channel train, the first channel and the second channel arranged so as to contact the continuous phase fluid and the dispersed phase fluid at a contacting region, and the at least one product generator comprising (1) a velocity reduction section upstream of the contacting region and configured to reduce a velocity of at least one of the continuous phase fluid or the dispersed phase fluid as the at least one of the continuous phase fluid or the dispersed phase fluid approaches the contacting region and (2) a flow resistance increasing section upstream of the velocity reduction section such that fluid passing through the first inlet first traverses the flow resistance section and then the velocity reduction section before arriving at the contacting region; and one or more outlets for delivery of the product, one or more of the first inlet, the at least one first channel train, the second inlet, the second channel train, the at least one product generator, and the one or more outlets optionally being formed in a silicon substrate.

2. The microfluidic device of claim 1, wherein a product generator is a T-junction droplet maker, a flow focusing droplet maker, a Janus particle droplet maker, a multiple emulsion droplet maker, or any combination thereof.

3. The microfluidic device of claim 1, wherein the product generator further comprises a resistance increasing section.

4. The microfluidic device of claim 3, wherein the cross-sectional area of the velocity reduction section is larger than the cross-sectional area of the resistance increasing section.

5. The microfluidic device of claim 3, wherein the resistance increasing section comprises a bend.

6. The microfluidic device of claim 5, wherein the resistance increasing section comprises an elbow tum.

7. The microfluidic device of claim 6, wherein the resistance increasing section comprises two elbow turns arranged in a U-turn configuration.

8. The microfluidic device of claim 1, wherein the product generator comprises a resistance increasing section that comprises E1 elbow turns and that is associated with the first inlet, wherein the at least one second channel train comprises a resistance increasing section that comprises E2 elbow turns and that is associated with the second inlet, and wherein E2 is less than E1.

9. The microfluidic device of claim 1, wherein the at least one first channel train comprises a resistance increasing section that comprises E1 elbow turns and that is associated with the first inlet, wherein the at least one second channel train comprises a resistance increasing section that comprises E2 elbow turns and that is associated with the second inlet, and wherein E2 is greater than E1.

10. The microfluidic device of claim 3, wherein (a) the velocity reduction section has a cross-sectional area that is from about 5% to about 700% larger than a cross-sectional area of the resistance increasing section, (b) the velocity reduction section and the resistance increasing section are configured such that the velocity of fluid flowing through the velocity reduction section is 50% or less than the velocity of the fluid flowing through the resistance increasing section, or both (a) and (b).

11. A method of producing a plurality of microdroplets of a dispersed phase fluid in a continuous phase fluid, comprising:

with a microfluidic device according to claim 1, communicating the continuous phase fluid into the at least one first channel train and communicating the dispersed phase fluid into the at least one second channel train, the communicating the continuous phase fluid into the at least one first channel train and the communicating a dispersed phase fluid into the at least one second channel train being performed so as to give rise to the plurality of microdroplets of the dispersed phase fluid in the continuous phase fluid.

* * * * *